US012526684B2

(12) United States Patent
Gemelli et al.

(10) Patent No.: US 12,526,684 B2
(45) Date of Patent: Jan. 13, 2026

(54) LOAD MANAGEMENT OF OVERLAPPING CELLS BASED ON USER THROUGHPUT

(71) Applicant: Nokia Solutions and Networks Oy, Espoo (FI)

(72) Inventors: Riccardo Gemelli, Vimercate (IT); Giuliano Corbetta, Vimercate (IT); Marco Pischedda, Vimercate (IT); Reinhard Voese, Dallas, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 321 days.

(21) Appl. No.: 18/261,585

(22) PCT Filed: Jan. 19, 2021

(86) PCT No.: PCT/US2021/013983
§ 371 (c)(1),
(2) Date: Jul. 14, 2023

(87) PCT Pub. No.: WO2022/159079
PCT Pub. Date: Jul. 28, 2022

(65) Prior Publication Data
US 2024/0089781 A1 Mar. 14, 2024

(51) Int. Cl.
*H04W 28/02* (2009.01)
*H04W 28/06* (2009.01)
*H04W 28/08* (2023.01)

(52) U.S. Cl.
CPC ....... *H04W 28/0226* (2013.01); *H04W 28/06* (2013.01); *H04W 28/08* (2013.01); *H04W 28/0983* (2020.05)

(58) Field of Classification Search
None
See application file for complete search history.

(56) References Cited

U.S. PATENT DOCUMENTS

| 7,933,557 B1 * | 4/2011 | Townley ............... H04W 24/08 |
| | | 455/67.11 |
| 8,954,071 B2 | 2/2015 | Klatt et al. |
| | (Continued) | |

OTHER PUBLICATIONS

International Search Report and Written Opinion received for corresponding Patent Cooperation Treaty Application No. PCT/US2021/013983, dated Oct. 13, 2021, 13 pages.

(Continued)

*Primary Examiner* — Fadi Haj Said
(74) *Attorney, Agent, or Firm* — Nokia Technologies Oy

(57) ABSTRACT

Systems, methods, and software for load management among a plurality of cells that overlap a sector within a Radio Access Network (RAN). In one embodiment, a system performs sector throughput optimization over multiple optimization iterations of determining a total number of active users in the sector, determining a target number of users per cell that maximizes an aggregated user throughput of the sector where a sum of the target number of users per cell is equal to the total number of active users in the sector, determining recommended load distribution parameters for the sector based on the target number of users per cell that maximizes the aggregated user throughput of the sector, and applying the recommended load distribution parameters in the sector to distribute users among the cells.

16 Claims, 24 Drawing Sheets

(56) References Cited

U.S. PATENT DOCUMENTS

| | | | |
|---|---|---|---|
| 8,995,262 B2 | 3/2015 | Chowdhury et al. | |
| 9,474,002 B2 | 10/2016 | Gopal et al. | |
| 9,942,819 B2 | 4/2018 | Sunay et al. | |
| 2013/0143541 A1* | 6/2013 | Henderson | H04W 16/24 |
| | | | 455/418 |
| 2016/0057633 A1* | 2/2016 | Eskelinen | H04W 28/085 |
| | | | 370/252 |
| 2017/0359754 A1 | 12/2017 | Yousefi'zadeh et al. | |
| 2018/0368037 A1* | 12/2018 | Wang | H04W 28/0205 |
| 2019/0208438 A1 | 7/2019 | Yang et al. | |
| 2020/0275334 A1* | 8/2020 | Visuri | H04W 36/22 |

OTHER PUBLICATIONS

Esteves et al., "Performance of fixed wireless access with cdma2000 1xEV-DO", IEEE 58th Vehicular Technology Conference. VTC 2003-Fall (IEEE Cat. No.03CH37484), Oct. 6-9, 2003, pp. 836-840. International Search Report and Written Opinion received for corresponding Patent Cooperation Treaty Application No. PCT/US2021/013988, dated Oct. 14, 2021, 15 pages.

* cited by examiner

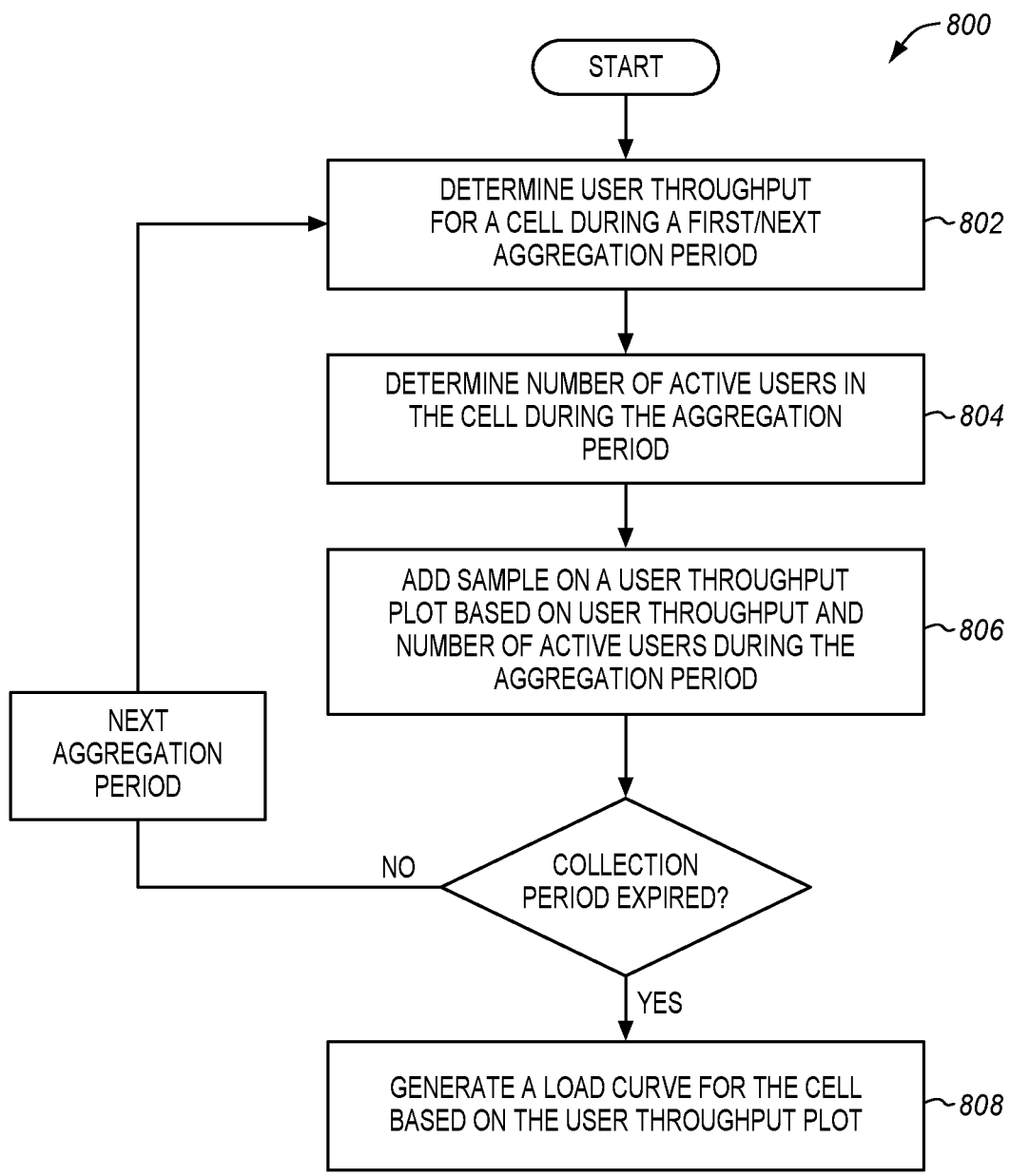

LOAD MANAGEMENT OF OVERLAPPING CELLS BASED ON USER THROUGHPUT

RELATED APPLICATION

This application claims priority to PCT Patent Application No. PCT/US2021/013983, filed Jan. 19, 2021, and entitled "LOAD MANAGEMENT OF OVERLAPPING CELLS BASED ON USER THROUGHPUT" which is incorporated herein by reference in its entirety.

TECHNICAL FIELD

This disclosure is related to the field of communication systems and, in particular, to load management in an access network.

BACKGROUND

A Radio Access Network (RAN) is part of a mobile communication system that interacts with mobile devices (e.g., User Equipment (UE)) via a radio access technology to connect the mobile devices with a core network to receive services. A RAN includes a plurality of base stations that provide coverage to the mobile devices over a geographic area. The base stations include equipment configured to interface with mobile devices via the air interface, such as antennas, transmitters, receivers, etc., and equipment configured to interface with the core network, such as routers, controllers, etc. The geographic area served by the RAN is typically partitioned into smaller regions referred to as sectors, and the goal of a carrier is to provide adequate coverage for each sector. Thus, one or more base stations are typically located at edges of the sectors, and the antennas of one or more base stations are directed toward each sector of the RAN. For example, a base station may include directional antennas covering arcs around the base station (e.g., 120 degrees or less), with each directional antenna aimed toward a different sector. A common configuration is a three-sector configuration, where a base station is located at the intersection of three adjacent sectors, and the base station includes three directional antennas each directed toward one of the adjacent sectors.

A directional antenna of a base station forms a cell within the RAN. A cell comprises a radio coverage area created by transmission and reception of RF signals. Whereas a sector represents a partition of a larger geographical area served by a RAN, a cell represents the actual radio coverage area of a base station via RF signals (i.e., through a directional antenna). A cell of a base station is "overlaid" on a sector to provide radio coverage in at least a portion of a sector. For example, when a directional antenna of a base station is aimed toward a sector, the cell formed with the directional antenna is overlaid on part of or the entirety of the sector. Thus, by locating base stations at the edges of the sectors, the cells of the base stations provide coverage for the sectors.

To provide adequate coverage, multiple cells may have an overlapping coverage footprint. For example, a base station may include multiple directional antennas aimed toward the same sector, with each directional antenna forming a cell that overlaps the sector. In another example, neighboring base stations may form cells that overlap a sector. To ensure efficient operation and optimal use of resources, carriers typically implement some type of load management scheme that attempts to equalize the load among the cells. However, it remains a problem to identify efficient and effective ways of managing traffic load among overlapping cells.

SUMMARY

Described herein is a load management scheme that takes into account the user throughput of a sector. Due to increasing traffic demand on RANs, network operators desire to maximize the usage of the cells. Present load management schemes distribute traffic in a manner that emphasizes load equalization between the cells overlapping a sector without accounting for the performance of those cells. The load management scheme described herein takes the user throughput of a sector into consideration, and sets out to optimize the user throughput as a measure of end user performance by distributing traffic according to performance models of the individual cells. One technical benefit is traffic (i.e., user traffic) is intelligently distributed across the cells based on user throughput in order to provide a quality end-user experience and performance.

One embodiment comprises a system that provides load management for a RAN. The system comprises at least one processor and memory. The processor causes the system to identify a plurality of cells overlapping at a sector of the RAN. The processor causes the system to perform sector throughput optimization over multiple optimization iterations of determining a total number of active users in the sector, determining a target number of users per cell that maximizes an aggregated user throughput of the sector where a sum of the target number of users per cell is equal to the total number of active users in the sector, determining recommended load distribution parameters for the sector based on the target number of users per cell that maximizes the aggregated user throughput of the sector, and applying the recommended load distribution parameters in the sector to distribute users among the cells.

In another embodiment, the processor causes the system to determine a busy hour for the sector, and determine the target number of users per cell that maximizes the aggregated user throughput of the sector during the busy hour.

In another embodiment, the processor causes the system to identify load curves for the cells where each of the load curves indicates a relationship between user throughput and a number of active users for a respective cell, and determine the target number of users per cell that maximizes the aggregated user throughput of the sector based on the load curves. In another embodiment, the processor causes the system to generate a load curve for each cell of the cells by: (a) determining user throughput for the cell during an aggregation period; (b) determining a number of active users in the cell during the aggregation period; (c) adding a sample on a user throughput plot based on the user throughput and the number of active users determined in the cell during the aggregation period; (d) repeating (a)-(c) over a collection period that is longer than the aggregation period to obtain a plurality of samples on the user throughput plot; and (e) generating, after the collection period, the load curve for the cell based on the user throughput plot.

In another embodiment, the processor causes the system to determine the target number of users per cell that maximizes the aggregated user throughput of the sector by identifying permutations of the target number of users per cell where the sum of the target number of users per cell for each of permutations equals the total number of active users in the sector, calculating the aggregated user throughput for the sector regarding each of the permutations, and identifying a recommended permutation that provides a maximum aggregated user throughput for the sector, where the recommended permutation indicates the target number of users per cell that maximizes the aggregated user throughput of the sector.

In another embodiment, the processor causes the system to determine the target number of users per cell that maximizes the aggregated user throughput of the sector by determining an upper bound and a lower bound for the target number of users per cell, identifying permutations of the target number of users per cell where the sum of the target number of users per cell equals the total number of active users in the sector and the target number of users per cell is within the upper bound and the lower bound, calculating the aggregated user throughput for the sector regarding each of the permutations, and identifying a recommended permutation that provides a maximum aggregated user throughput for the sector, where the recommended permutation indicates the target number of users per cell that maximizes the aggregated user throughput of the sector.

In another embodiment, the recommended load distribution parameters include percentage weights assigned to the cells to distribute the users among the cells, and the percentage weights are limited to a value range. The processor, for each cell of the cells, causes the system to determine a current percentage weight setting assigned to the cell, determine an actual traffic percentage for the cell, and calculate an updated percentage weight for the cell by adding the current percentage weight setting to a difference between the actual traffic percentage and an optimized traffic percentage, where the optimized traffic percentage is based on the target number of users per cell. The processor causes the system to scale the updated percentage weight for each of the cells to the value range.

In another embodiment, the recommended load distribution parameters include percentage weights assigned to the cells to distribute the users among the cells, and the percentage weights are limited to a value range. The processor, for each cell of the cells, causes the system to determine percentage weight settings assigned to the cell for two prior optimization iterations, determine an actual number of users served by the cell for the two prior optimization iterations, compute a gradient of a variation of the actual number of users versus a variation of the percentage weight settings for the cell for the two prior optimization iterations, and calculate an updated percentage weight for the cell by dividing a difference between the target number of users and the actual number of users for the cell by the gradient, and adding a result of the division to the percentage weight setting for the prior optimization iteration. The processor causes the system to scale the updated percentage weight for each of the cells to the value range.

In another embodiment, the processor causes the system to determine, at a machine learning system, whether the recommended load distribution parameters for a current optimization iteration provides a positive yield in the aggregated user throughput of the sector based on a yield prediction model. The processor causes the system to apply the recommended load distribution parameters in the sector when the recommended load distribution parameters for the current optimization iteration provides a positive yield in the aggregated user throughput of the sector, and mask the recommended load distribution parameters for the current optimization iteration when the recommended load distribution parameters for the current optimization iteration do not provide a positive yield in the aggregated user throughput of the sector.

Another embodiment comprises a method of load management in a RAN. The method comprises identifying a plurality of cells overlapping at a sector of the RAN, and performing sector throughput optimization over multiple optimization iterations of determining a total number of active users in the sector, determining a target number of users per cell that maximizes an aggregated user throughput of the sector where a sum of the target number of users per cell is equal to the total number of active users in the sector, determining recommended load distribution parameters for the sector based on the target number of users per cell that maximizes the aggregated user throughput of the sector, and applying the recommended load distribution parameters in the sector to distribute users among the cells.

In another embodiment, the method further comprises determining a busy hour for the sector. The step of determining the target number of users per cell comprises determining the target number of users per cell that maximizes the aggregated user throughput of the sector during the busy hour.

In another embodiment, the method further comprises identifying load curves for the cells, where each of the load curves indicates a relationship between user throughput and a number of active users for a respective cell. The step of determining the target number of users per cell comprises determining the target number of users per cell that maximizes the aggregated user throughput of the sector based on the load curves.

In another embodiment, identifying the load curves for the cells comprises generating a load curve for each cell of the cells by: (a) determining user throughput for the cell during an aggregation period; (b) determining a number of active users in the cell during the aggregation period; (c) adding a sample on a user throughput plot based on the user throughput and the number of active users determined in the cell during the aggregation period; (d) repeating (a)-(c) over a collection period that is longer than the aggregation period to obtain a plurality of samples on the user throughput plot; and (e) generating, after the collection period, the load curve for the cell based on the user throughput plot.

In another embodiment, the step of determining the target number of users per cell that maximizes the aggregated user throughput of the sector comprises identifying permutations of the target number of users per cell where the sum of the target number of users per cell for each of permutations equals the total number of active users in the sector, calculating the aggregated user throughput for the sector regarding each of the permutations, and identifying a recommended permutation that provides a maximum aggregated user throughput for the sector, where the recommended permutation indicates the target number of users per cell that maximizes the aggregated user throughput of the sector.

In another embodiment, the step of determining the target number of users per cell that maximizes the aggregated user throughput of the sector comprises determining an upper bound and a lower bound for the target number of users per cell, identifying permutations of the target number of users per cell where the sum of the target number of users per cell equals the total number of active users in the sector and the target number of users per cell is within the upper bound and the lower bound, calculating the aggregated user throughput for the sector regarding each of the permutations, and identifying a recommended permutation that provides a maximum aggregated user throughput for the sector, where the recommended permutation indicates the target number of users per cell that maximizes the aggregated user throughput of the sector.

In another embodiment, the recommended load distribution parameters include percentage weights assigned to the cells to distribute the users among the cells, and the percentage weights are limited to a value range. For each cell of the cells, the method further comprises determining a current percentage weight setting assigned to the cell, determining an actual traffic percentage for the cell, and calculating an updated percentage weight for the cell by adding the current percentage weight setting to a difference between the actual traffic percentage and an optimized traffic percentage, where the optimized traffic percentage is based on the target number of users per cell. The method further comprises scaling the updated percentage weight for each of the cells to the value range.

In another embodiment, the recommended load distribution parameters include percentage weights assigned to the cells to distribute the users among the cells, and the percentage weights are limited to a value range. For each cell of the cells, the method further comprises determining percentage weight settings assigned to the cell for two prior optimization iterations, determining an actual number of users served by the cell for the two prior optimization iterations, computing a gradient of a variation of the actual number of users versus a variation of the percentage weight settings for the cell for the two prior optimization iterations, and calculating an updated percentage weight for the cell by dividing a difference between the target number of users and the actual number of users for the cell by the gradient, and adding a result of the division to the percentage weight setting for the prior optimization iteration. The method further comprises scaling the updated percentage weight for each of the cells to the value range.

In another embodiment, the method further comprises determining, at a machine learning system, whether the recommended load distribution parameters for a current optimization iteration provides a positive yield in the aggregated user throughput of the sector based on a yield prediction model. The method further comprises applying the recommended load distribution parameters in the sector when the recommended load distribution parameters for the current optimization iteration provides a positive yield in the aggregated user throughput of the sector, and masking the recommended load distribution parameters for the current optimization iteration when the recommended load distribution parameters for the current optimization iteration do not provide a positive yield in the aggregated user throughput of the sector.

Another embodiment comprises a non-transitory computer readable medium embodying programmed instructions executed by a processor, where the instructions direct the processor to implement a method of load management in a RAN. The method comprises identifying a plurality of cells overlapping at a sector of the RAN, and performing sector throughput optimization over multiple optimization iterations of determining a total number of active users in the sector, determining a target number of users per cell that maximizes an aggregated user throughput of the sector where a sum of the target number of users per cell is equal to the total number of active users in the sector, determining recommended load distribution parameters for the sector based on the target number of users per cell that maximizes the aggregated user throughput of the sector, and applying the recommended load distribution parameters in the sector to distribute users among the cells.

Another embodiment comprises a system that provides load management for a RAN. The system comprises a means for identifying a plurality of cells overlapping at a sector of the RAN. The system further comprises a means for performing sector throughput optimization over multiple optimization iterations of determining a total number of active users in the sector, determining a target number of users per cell that maximizes an aggregated user throughput of the sector where a sum of the target number of users per cell is equal to the total number of active users in the sector, determining recommended load distribution parameters for the sector based on the target number of users per cell that maximizes the aggregated user throughput of the sector, and applying the recommended load distribution parameters in the sector to distribute users among the cells.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 8 is a flow chart illustrating a method of generating a load curve for a cell in an illustrative embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
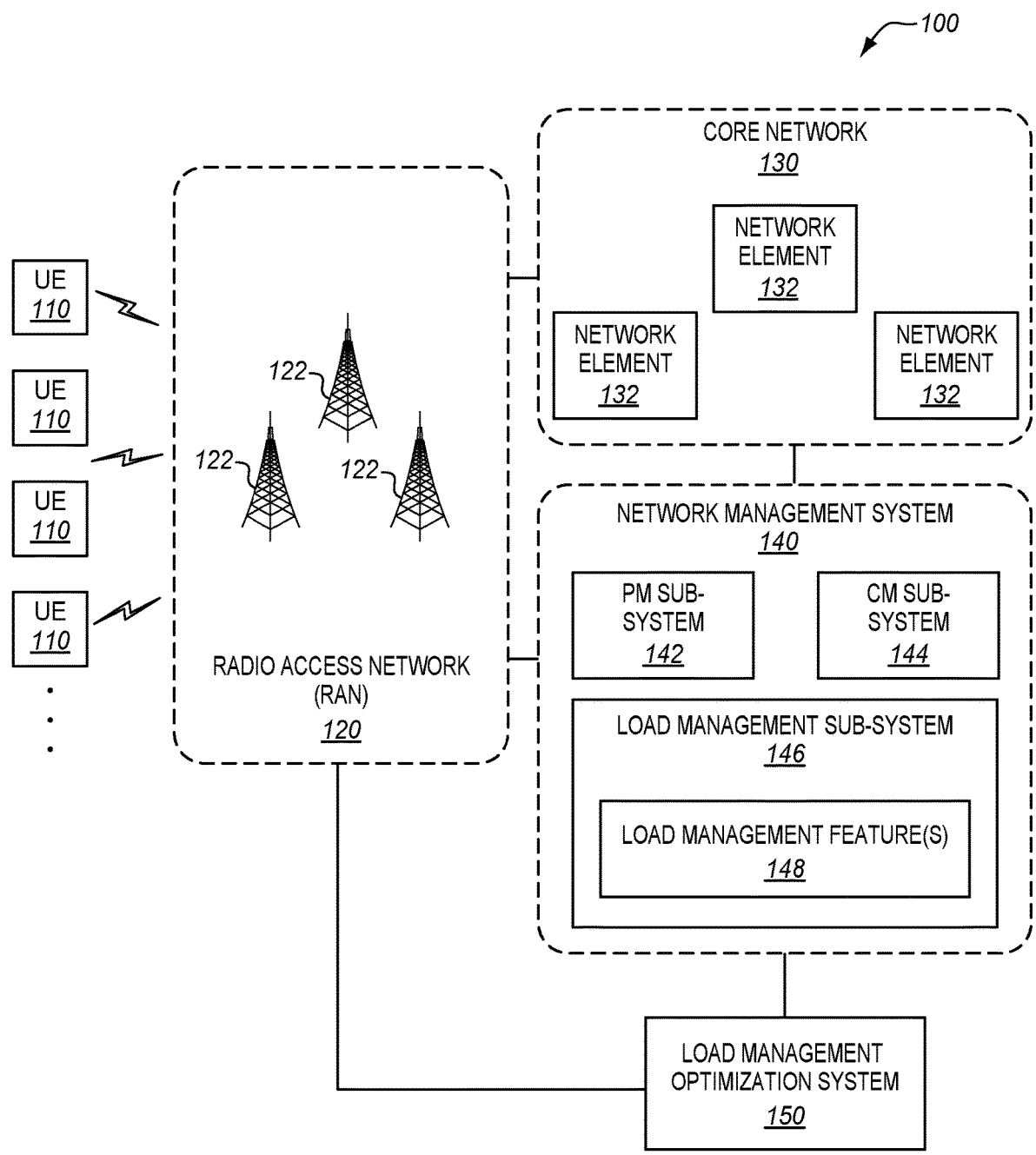
FIG. 1 illustrates a communication system in an illustrative embodiment.

FIG. 1 illustrates a communication system 100 in an illustrative embodiment. Communication system 100 is a cellular network or mobile network where the last link is wireless, and provides voice and/or data services to a plurality of devices. Communication system 100 is a Fourth Generation (4G) network (e.g., a Long Term Evolution (LTE) network), a next-generation network (e.g., 5G or later), or another type of network.

Communication system 100 is illustrated as providing communication services to User Equipment (UE) 110. UEs 110 may be enabled for voice services, data services, Machine-to-Machine (M2M) or Machine Type Communications (MTC) services, and/or other services. A UE 110 may be an end user device such as a mobile phone (e.g., smart phone), a tablet or PDA, a computer with a mobile broadband adapter, etc. A UE 110 may be referred to generally herein as a "user".

Communication system 100 includes one or more Radio Access Networks (RAN) 120 that communicate with UEs 110 over a radio interface. RAN 120 may support Evolved-UMTS Terrestrial Radio Access Network (E-UTRAN) access, Wireless Local Area Network (WLAN) access, new Radio Access Technologies (RAT), etc. As an example, RAN 120 may comprise an E-UTRAN or Next Generation RAN (NG-RAN). RAN 120 includes a plurality of base stations 122 that are dispersed over a geographic area. A base station 122 comprises an entity that uses radio communication technology to communicate with a UE 110, and interface the UE 110 with a core network 130. As described above, a base station 122 includes equipment configured to interface with UEs 110 via the air interface, such as antennas, transmitters, receivers, etc., and equipment configured to interface with core network 130, such as routers, controllers, etc. One or more of base stations 122 may communicate on the licensed spectrum, and one or more of the base stations 122 may communicate on an unlicensed spectrum. In one embodiment, one or more of base stations 122 may comprise an Evolved-NodeB (eNodeB) of an E-UTRAN. In another embodiment, one or more of base stations 122 may comprise a gNodeB (NR base stations) and/or ng-eNodeB (LTE base stations supporting a 5G Core Network) of an NG-RAN.

Core network 130 is the central part of communication system 100 that provides various services to customers who are connected by RAN 120. One example of core network 130 is the Evolved Packet Core (EPC) network as suggested by the 3GPP for LTE. Another example of core network 130 is a 5G core network as suggested by the 3GPP. Core network 130 includes network elements 132, which may comprise servers, devices, apparatus, or equipment (including hardware) that provide services for UEs 110. Network elements 132, in an EPC network, may comprise a Mobility Management Entity (MME), a Serving Gateway (S-GW), a Packet Data Network Gateway (P-GW), etc. Network elements 132, in a 5G network, may comprise an Access and Mobility Management Function (AMF), a Session Management Function (SMF), a Policy Control Function (PCF), an Application Function (AF), a User Plane Function (UPF), etc.

Communication system 100 further includes a network management system (NMS) 140. Network management system 140 is a system that monitors, maintains, and manages RAN 120 and/or core network 130, and provides functionality for a network operator to view and manage the operation of RAN 120 and/or core network 130. Network management system 140 includes a performance management (PM) sub-system 142 and a configuration management (CM) sub-system 144. Performance management sub-system 142 is configured to collect performance indicators or metrics (i.e., Key Performance Indicators (KPI)) from RAN 120 and/or core network 130. Configuration management sub-system 144 is configured to monitor, update, and report network configuration parameters to RAN 120 and/or core network 130. Network management system 140 also includes a load management sub-system 146. Load management sub-system 146 is configured to implement one or more load management features 148 to distribute the load in RAN 120 among cells of RAN 120. Load management sub-system 146 is illustrated as part of network management system 140 for the sake of example, and at least some portions of load management sub-system 146 may be implemented in RAN 120, base stations 122, or another network element as desired.

The load management feature(s) 148 utilized by load management sub-system 146 may depend on the status or state of users (i.e., UE 110). As some background, when powering on, a UE 110 performs cell selection by measuring a Received Signal Strength Indicator (RSSI) for a set of channels. The channels having an RSSI over a threshold are considered as candidate cells for the UE 110. The UE 110 decodes the Primary Synchronization Signal (PSS) and the Secondary Synchronization Signal (SSS) to achieve downlink frame synchronization, and to identify the Physical Layer Cell Identity (PCI) for each of the candidate cells. The UE 110 also receives System Information for each of the cells by decoding the Master Information Block (MIB) and System Information Blocks (SIBs) that are broadcast by the cells over the broadcast channel. The MIB carries physical layer information of a cell that assists the UE 110 in receiving further SIBs (e.g., system bandwidth). The SIBs carry other system information, such as the Public Land Mobile Network (PLMN) ID, cell ID, Tracking Area Code (TAC), cell barring information (e.g., whether a UE is barred from camping on a cell), cell priority information, etc. The UE 110 then selects one of the candidate cells based on its cell selection criteria, and camps on the selected cell. At this point, the UE 110 is synchronized with the RAN 120 in the downlink (DL) direction. To synchronize with the RAN 120 in the uplink (UL) direction, the UE 110 performs a Random Access Procedure (RAP) over the Physical Random Access Channel (PRACH). The Random Access Procedure may occur upon initial access by the UE 110, during a Radio Resource Control (RRC) connection re-establishment procedure, upon handover, when UL synchronization is lost, etc.

A UE 110 transitions between an idle mode (or non-connected mode) and a connected mode (or active mode) while camped on the selected cell according to the RRC layer. The idle mode (e.g., RRC_IDLE) is a standby mode for a UE 110, where a Signaling Radio Bearer (SRB1) used for RRC messages is not established or is torn down, and no serving base station 122 is assigned to the UE 110. In idle mode, the UE 110 has limited communication with RAN 120, such as to receive an RRC Paging message. When UE 110 has data to transfer to RAN 120 (UL data) or receives a Paging message that data is buffered for UE 110 (DL data), the UE 110 may initiate an RRC connection establishment procedure, which transitions the UE 110 to connected mode (e.g., RRC_CONNECTED). In connected mode, an RRC connection is established and UE 110 is able to transfer data to, and receive data from, a base station 122. With an RRC connection set up, an SRB1 is established between UE 110 and the base station 122 for exchange of signaling messages.

UE mobility is handled differently depending on whether the UE 110 is in idle mode or connected mode. In idle mode, the UE 110 decides which cell to camp on, but the presence of UE 110 may not be known at the cell level because the base stations 122 do not have any context for the UE 110. However, a base station 122 can influence cell reselection of a UE 110 through configuration parameters. In connected mode, the presence of the UE 110 is known to the RAN 120, and the RAN 120 controls which cell serves the UE 110 using a procedure known as handover.

One load management feature 148 utilized by load management sub-system 146 may perform idle mode load balancing, where cell reselection parameters are adjusted for the idle users based on the current active user condition. Parameters that control cell reselection are transmitted to a UE in the SIBs. Another load management feature 148 utilized by load management sub-system 146 may perform active mode load balancing, which allows active users to be load balanced across cells to lower the overall congestion across the cells. For active mode load balancing, the RAN 120 has direct measurements and knowledge of each user's traffic requirements and radio conditions before deciding to load balance. Active mode load balancing is performed with a handover procedure from a serving cell to a target cell using handover configuration parameters. Yet another load management feature 148 utilized by load management sub-system 146 may perform inter-frequency load balancing. Load management sub-system 146 may implement one or more of the above load management features 148, or other load management features not specifically discussed herein. The load management features 148 may operate based on load distribution parameters, which are described in further detail below.

Figure 2:
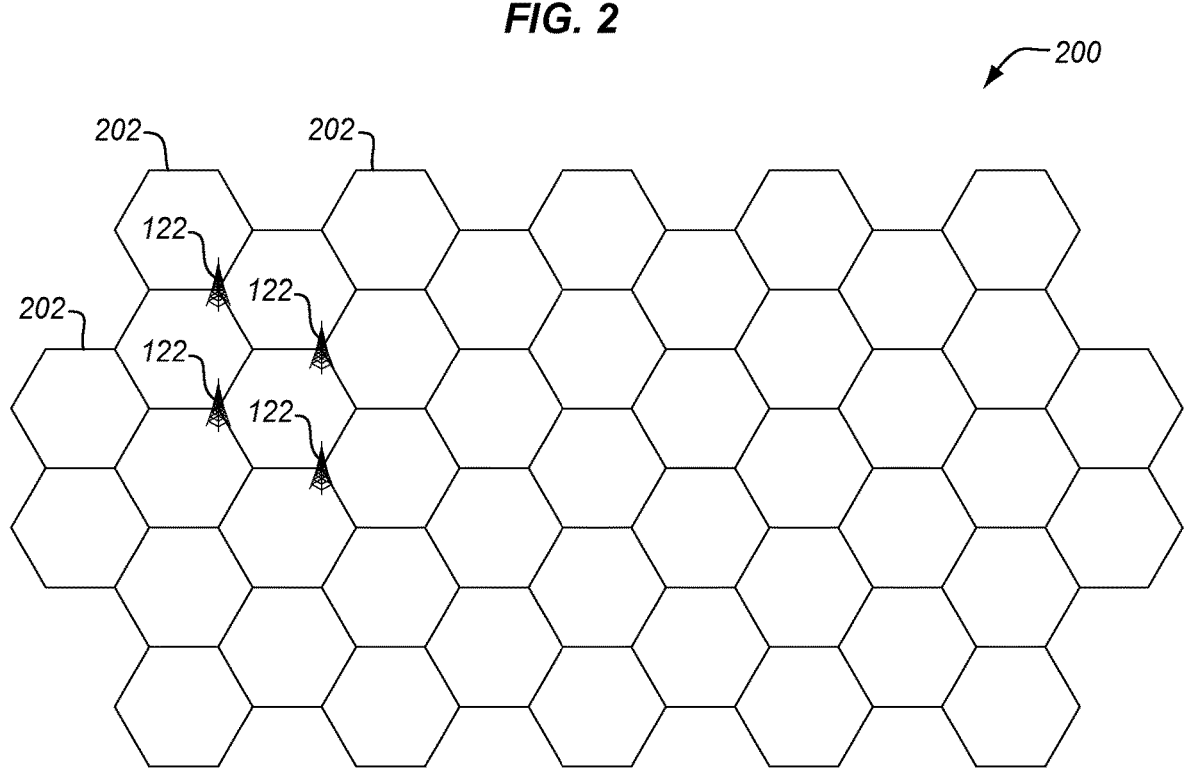
FIG. 2 illustrates a geographic area served by a RAN in an illustrative embodiment.
Figure 3:
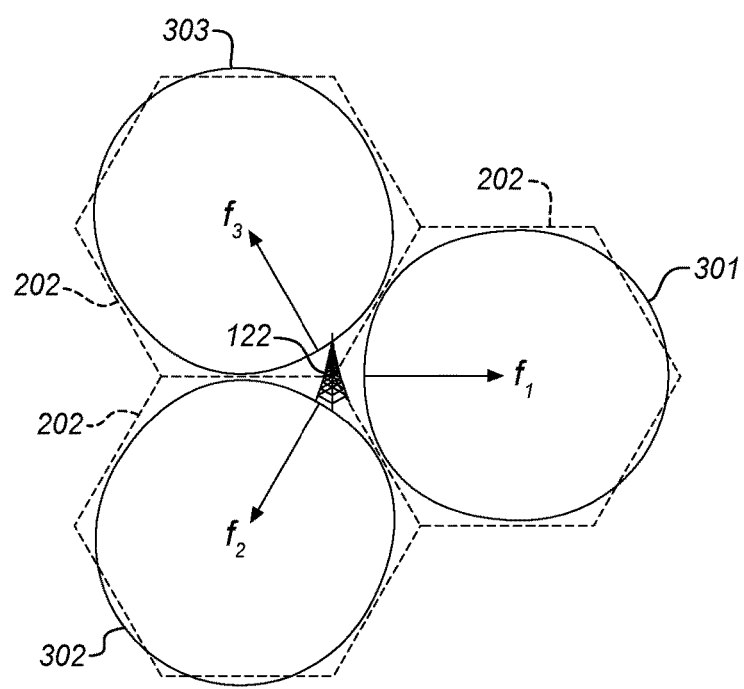
FIG. 3 illustrates a base station in an illustrative embodiment.

FIG. 2 illustrates a geographic area 200 served by RAN 120 in an illustrative embodiment. Geographic area 200 is partitioned into smaller regions referred to as sectors 202 (illustrated as hexagons). In this embodiment, base stations 122 are located at edges of the sectors 202 so that a cell of one or more of the base stations 122 provides coverage for at least a portion of a sector 202. It is noted that a subset of base stations 122 is shown in FIG. 2 for brevity, and RAN 120 may include more base stations 122 to provide adequate coverage over the entirety of geographic area 200. FIG. 3 illustrates a base station 122 in an illustrative embodiment. In this embodiment, base station 122 is located at the intersection of three sectors 202, and forms three cells 301-303. For example, base station 122 may include three directional antennas that each provides 120 degrees coverage to form cells 301-303. However, the implementation shown in FIG. 3 is just an example, and a base station 122 may form a different number of cells 301-303 in other embodiments. Each cell 301-303 of base station 122 may operate using a different carrier frequency. For example, cell 301 may use carrier frequency $f_1$ cell 302 may use carrier frequency $f_2$, and cell 303 may use carrier frequency $f_3$.

Figure 4A:
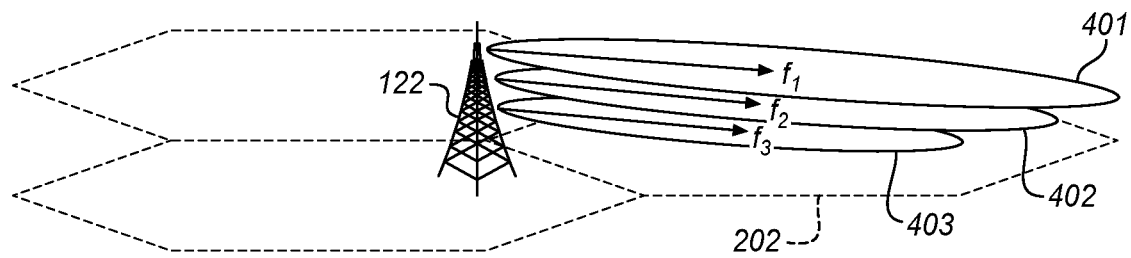
FIG. 4A illustrates overlapping cells from a single base station in an illustrative embodiment.

In one deployment, multiple cells may overlap at a sector 202 to avoid gaps in coverage, to maximum the bandwidth at the sector 202, etc. The cells overlapping a sector 202 may be from the same base station 122, and/or from neighboring or adjacent base stations 122. FIG. 4A illustrates overlapping cells from a single base station 122 in an illustrative embodiment. In this embodiment, base station 122 is installed at or near an edge of a sector 202, and forms or provides three cells 401-403 that overlap at sector 202. For example, base station 122 may include three directional antennas that are aimed toward sector 202, and form the three cells 401-403. Cells 401-403 are therefore "stacked" at sector 202, and at least partially share their spatial footprint. Cells 401-403 may have different ranges depending on the carrier frequency, transmit/receive power, etc. Due to the positions and ranges of the individual cells 401-403, the cells 401-403 may fully or partially overlap at sector 202. Each cell 401-403 may operate using a different carrier frequency (e.g., $f_1$, $f_2$, and $f_3$), and belong to a different frequency layer than one another to avoid interference. It is noted that the labels of the carrier frequencies $f_1$, $f_2$, and $f_3$ are used to differentiate the carrier frequencies of the cells 401-403 overlapping sector 202, and are not meant to indicate that the same carrier frequencies are used as shown in FIG. 3. The actual carrier frequencies for the cells described herein are assigned based on a desired frequency reuse scheme.

Figure 4B:
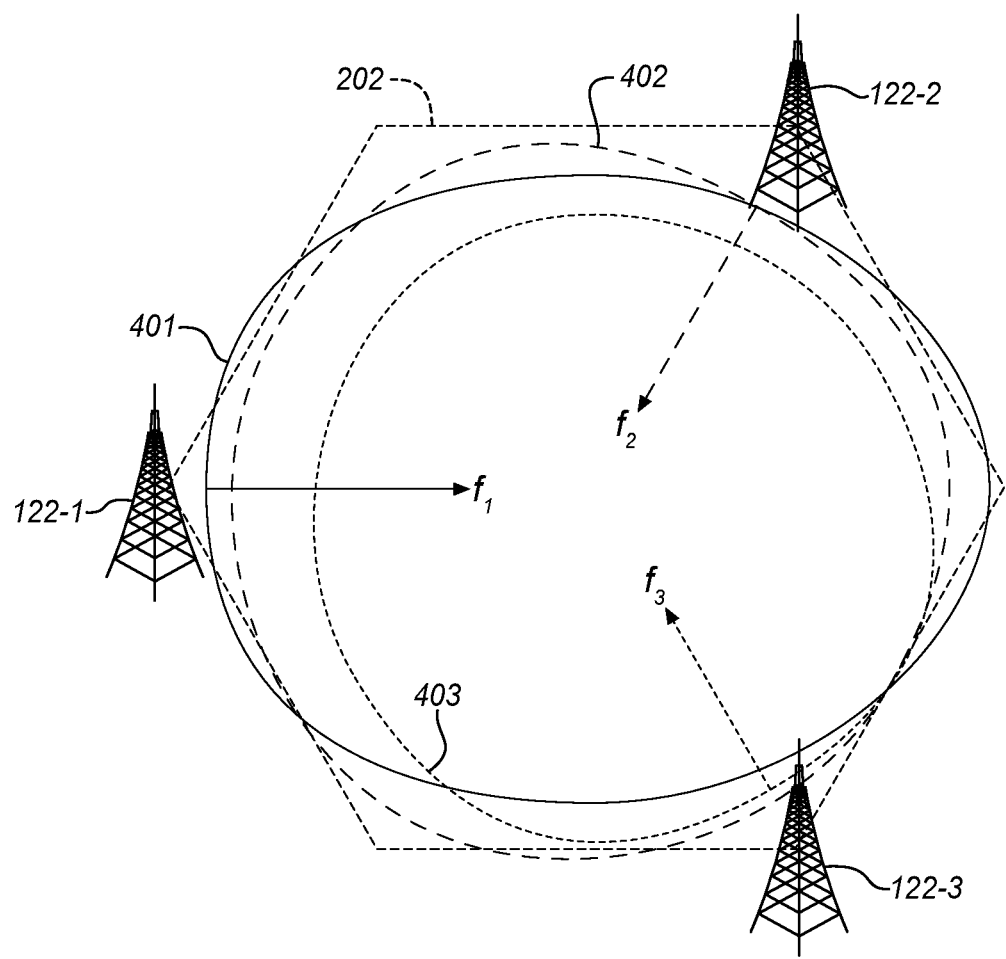
FIG. 4B illustrates overlapping cells from neighboring base stations in an illustrative embodiment.

In another embodiment, cells 401-403 overlapping a sector 202 may be from two or more adjacent base stations 122. FIG. 4B illustrates overlapping cells from neighboring base stations 122 in an illustrative embodiment. In this embodiment, three neighboring or adjacent base stations 122-1, 122-2, and 122-3 are shown that are installed at or near an edge of a sector 202. Base station 122-1 forms or provides cell 401 (indicated by a solid line), base station 122-2 forms or provides cell 402 (indicated by a dashed line), and base station 122-3 forms or provides cell 403 (indicated by a dotted line). It is noted that the other cells of these base stations 122 are not shown for simplicity. As above, cells 401-403 may have different ranges depending on the carrier frequency, transmit/receive power, etc. Due to the positions and ranges of the individual cells 401-403, the cells 401-403 may fully or partially overlap at sector 202. Each cell 401-403 may operate using a different carrier frequency (e.g., $f_1$, $f_2$, and $f_3$), and belong to a different frequency layer than one another to avoid interference.

The number of cells 401-403 overlapping a sector 202 in the above embodiments is provided as an example, and more or less cells may overlap a sector 202 in other embodiments.

Cells 401-403 that overlap a sector 202 are generally different in terms of coverage (e.g., reach) and performance (e.g., user throughput provided to a UE 110). Improvement may be achieved by steering users among cells 401-403; generally from loaded cells with lower performances to less loaded cells with higher performances. Load management sub-system 146 (see FIG. 1) is configured to implement one or more load management features 148 (i.e., load balancing or load equalization) to distribute the load among the cells 401-403. In the embodiments described herein, communication system 100 further implements a load management optimization system 150. Load management optimization system 150 is configured to determine an optimized traffic split for the cells 401-403 overlapping sectors 202. More particularly, load management optimization system 150 takes user throughput of a sector 202 into consideration in determining an optimal proportion of users per cell 401-403 in the sector 202 for distributing traffic amongst the cells 401-403, which is referred to as sector throughput optimization. Load management optimization system 150 may therefore provide a recommendation of the optimal proportion to the network (i.e., network management system 140 and/or RAN 120) to assist in steering traffic to the cells 401-403 overlapping sectors 202.

Figure 5:
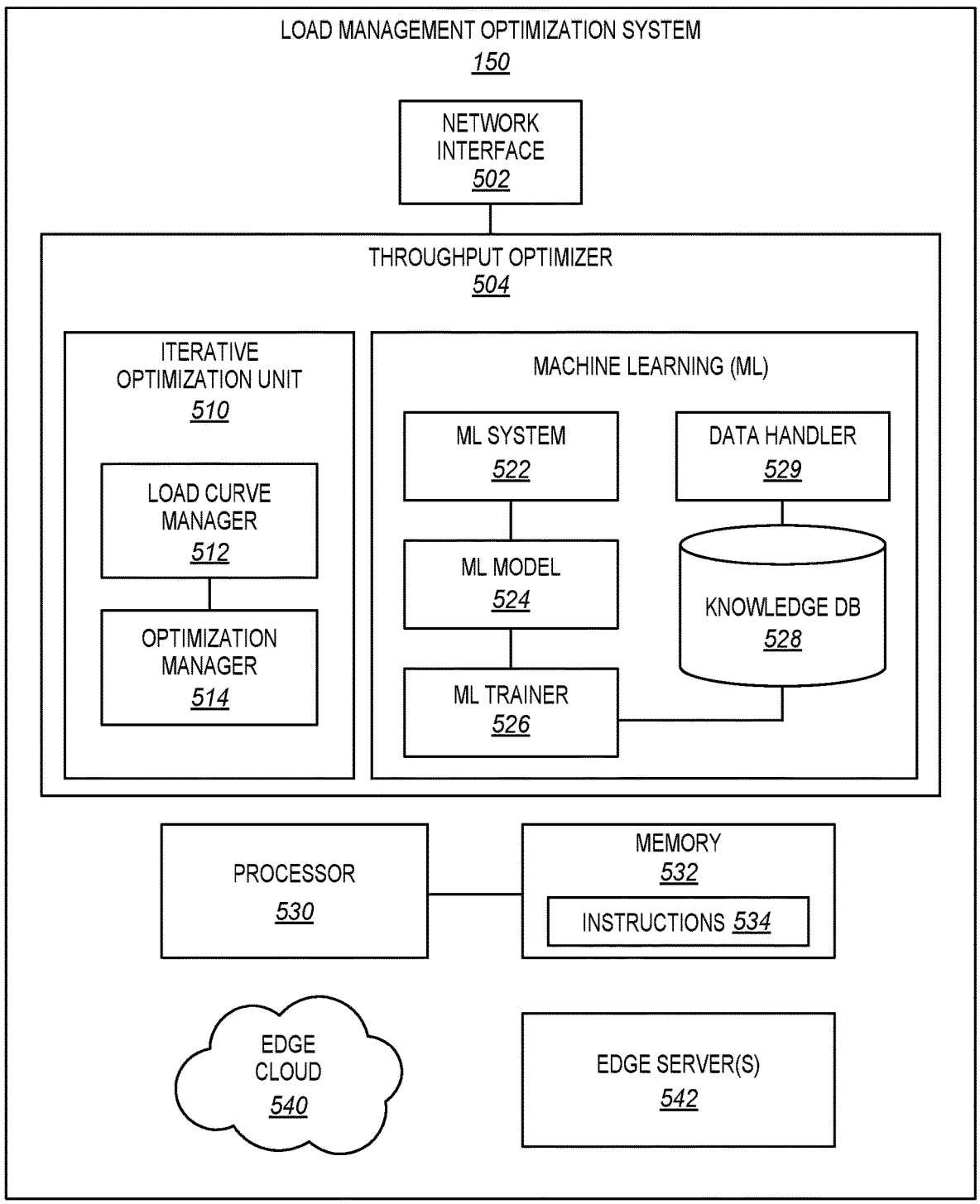
FIG. 5 is a block diagram of a load management optimization system in an illustrative embodiment.

FIG. 5 is a block diagram of load management optimization system 150 in an illustrative embodiment. At a high level, load management optimization system 150 is configured to optimize how traffic is distributed among cells 401-403 that overlap a sector 202. Load management optimization system 150 may be implemented outside of network management system 140 (e.g., on a different infrastructure) as shown in FIG. 1, may be implemented at network management system 140 on the same infrastructure, may be distributed between network management system 140 and an external infrastructure, may be implemented within RAN 120 or base stations 122 within RAN 120, etc. For example, a carrier may purchase load management optimization system 150, and implement it for RAN 120 and/or other RANs of its network. In another example, load management optimization system 150 may be implemented by a third-party provider, and a carrier may hire the third party provider to optimize traffic distribution for one or more sectors of its network.

In this embodiment, load management optimization system 150 may include or provide the following subsystems: a network interface component 502 and a throughput optimizer 504. Network interface component 502 is a hardware component that exchanges messages, signaling, or packets with other elements, such as RAN 120, network management system 140, core network 130, and/or other systems. For example, network interface component 502 may receive performance metrics/indicators from PM sub-system 142, and may transmit configuration parameters to CM sub-system 144. Network interface component 502 may operate using a variety of protocols.

Throughput optimizer 504 comprises circuitry, logic, hardware, means, etc., configured to perform sector throughput optimization. As part of sector throughput optimization, throughput optimizer 504 determines recommended load distribution parameters for a sector 202 that maximize an aggregated user throughput of a sector 202. The recommended load distribution parameters may be provided to one or more load management features 148 utilized for RAN 120, such as part of the configuration parameters provided to RAN 120. Thus, the load management feature(s) 148 may then intelligently distribute users among the cells of a sector based on the recommended load distribution parameters, which improves overall user throughput and provides a quality end-user experience.

Load management optimization system 150 may include various other components or sub-systems not specifically illustrated in FIG. 5.

One or more of the subsystems of load management optimization system 150 may be implemented on a hardware platform comprised of analog and/or digital circuitry. One or more of the subsystems of load management optimization system 150 may be implemented on a processor 530 that executes instructions 534 stored in memory 532. Processor 530 comprises an integrated hardware circuit configured to execute instructions 534, and memory 532 is a non-transitory computer readable storage medium for data, instructions 534, applications, etc., and is accessible by processor 530. In other alternatives, one or more of the subsystems of load management optimization system 150 may be implemented on an edge cloud 540, one or more edge servers 542, or another architecture (e.g., Multi-access Edge Computing (MEC) architecture).

Figure 6A:
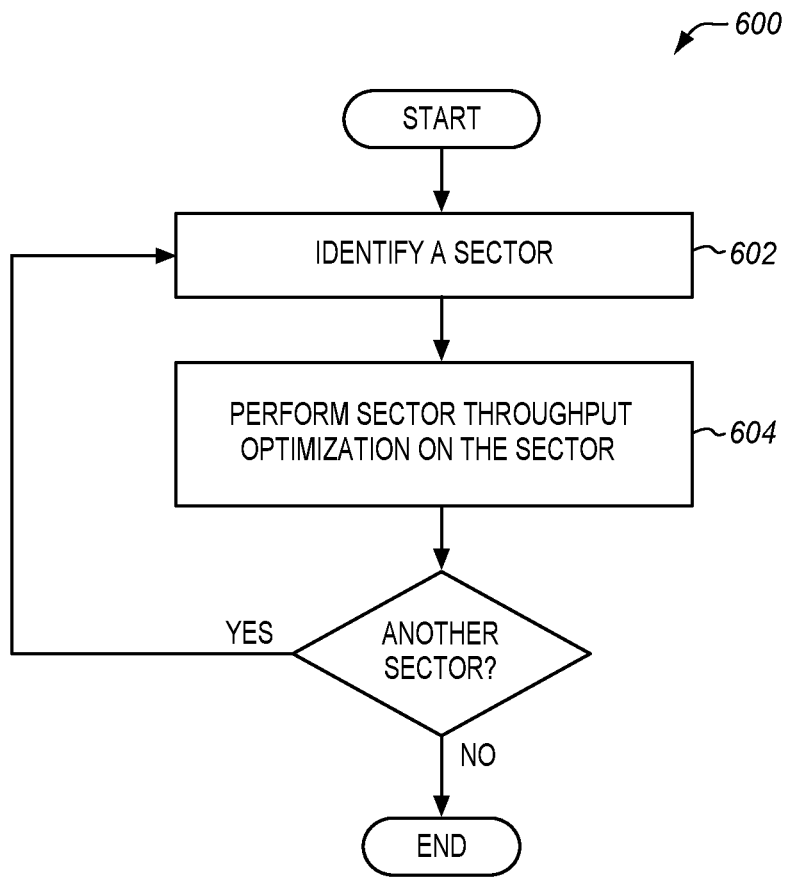
FIG. 6A is a flow chart illustrating a method of operating a throughput optimizer in an illustrative embodiment.
Figure 6B:
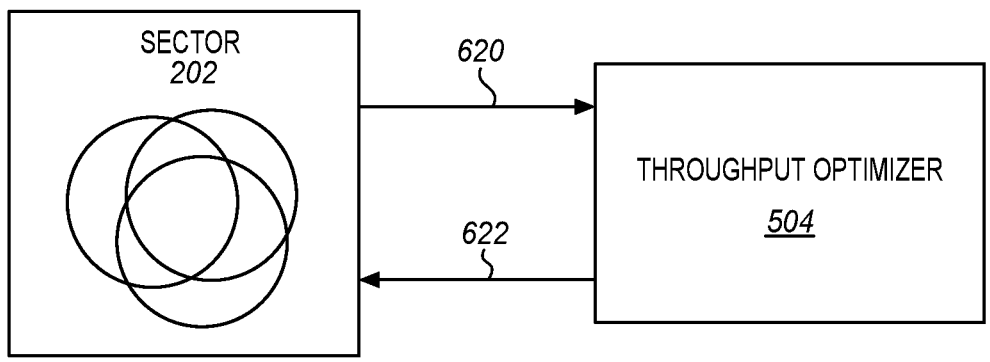
FIG. 6B is a schematic diagram of sector throughput optimization in an illustrative embodiment.

FIG. 6A is a flow chart illustrating a method 600 of operating throughput optimizer 504 in an illustrative embodiment. The steps of the flow charts described herein are not all inclusive and may include other steps not shown, and the steps may be performed in an alternative order. Throughput optimizer 504 may operate on one or more sectors 202 of a RAN 120. For example, a carrier may implement throughput optimizer 504 to operate on each of its sectors 202, a subset of sectors 202, etc. Thus, throughput optimizer 504 identifies a sector 202 targeted for optimization (step 602), which may be referred to as a target sector. Throughput optimizer 504 then performs sector throughput optimization on the sector (step 604). More detailed steps of performing sector throughput optimization are described below. Method 600 may repeat for a number of sectors 202 as desired by a carrier. FIG. 6B is a schematic diagram of sector throughput optimization in an illustrative embodiment. Throughput optimizer 504 receives sector information 620 regarding a sector 202 having overlapping cells, and performs sector throughput optimization on the sector 202 to generate recommended load distribution parameters 622 for the sector 202 that maximize aggregated user throughput of the sector 202.

Sector throughput optimization may be performed in a variety of ways as discussed below. One manner of sector throughput optimization is through an iterative process, referred to herein as iterative sector optimization. With iterative sector optimization, throughput optimizer 504 determines recommended load distribution parameters 622 that maximize the aggregated user throughput of a sector over multiple iterations. Another manner of sector throughput optimization is through a Machine-Learning (ML) system. With the ML system, throughput optimizer 504 determines recommended load distribution parameters 622 that maximize the aggregated user throughput of a sector based on training data for "similar" sectors, and is referred to herein as direct sector optimization.

Iterative Sector Optimization

To perform iterative sector optimization, throughput optimizer 504 in FIG. 5 may implement an iterative optimization unit 510 having the following subsystems: a load curve manager 512, and an optimization manager 514. Load curve manager 512 comprises circuitry, logic, hardware, means, etc., configured to identify or generate a load curve for cells 401-403 of RAN 120. A load curve is a performance model of a cell that indicates the relationship between user throughput for a cell, and the number of active users in the cell. Optimization manager 514 comprises circuitry, logic, hardware, means, etc., configured to determine an optimized traffic split between the cells 401-403 overlapping a sector 202. As is described in more detail below, optimization manager 514 is configured to determine a target number of users per cell 401-403 that maximizes or augments an aggregated user throughput of the sector 202, which indicates an optimized traffic split between the cells 401-403. Optimization manager 514 may be further configured to determine, modify, or adapt recommended load distribution parameters 622 based on the optimized traffic split.

Figure 7A:
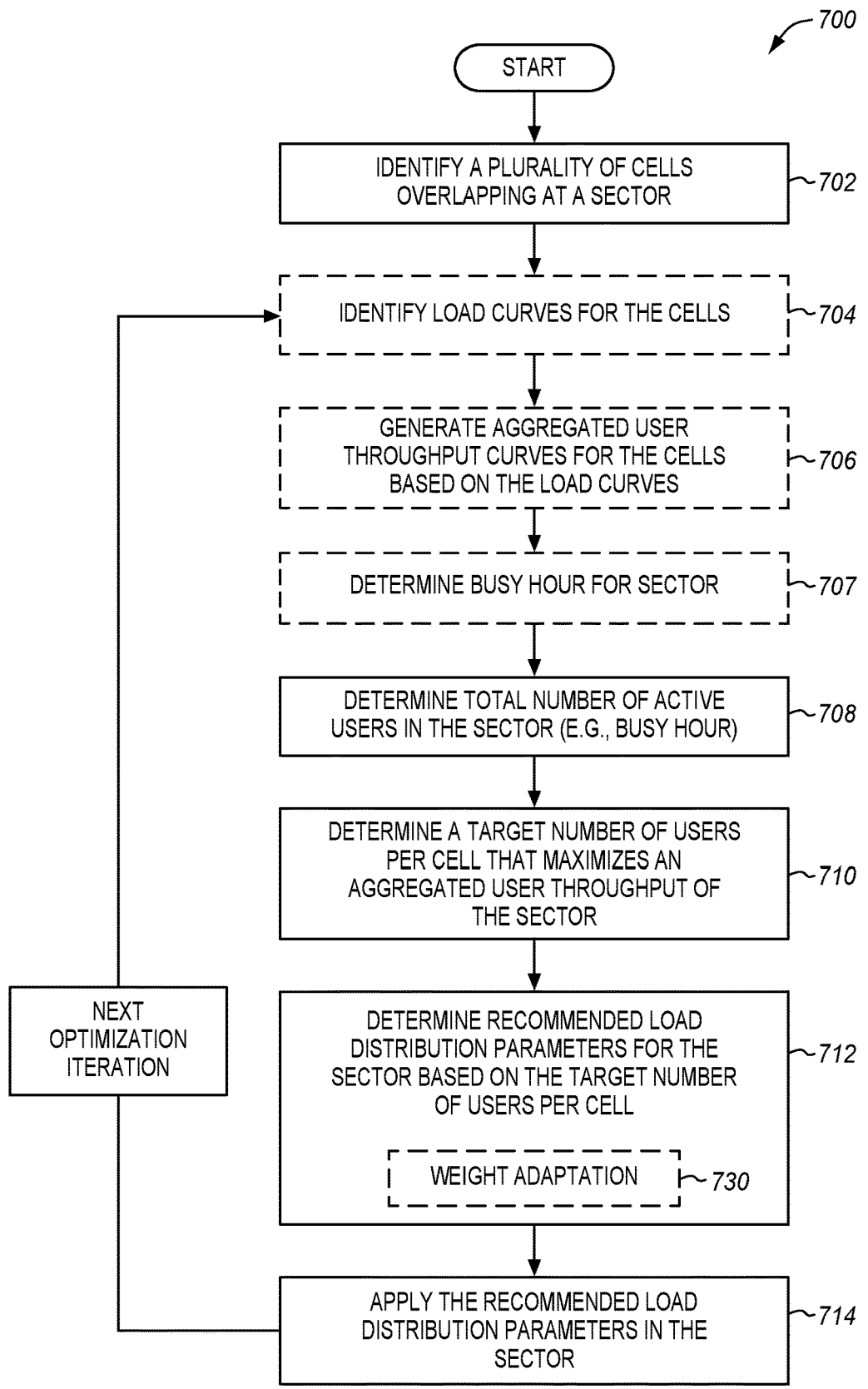
FIG. 7A is a flow chart illustrating a method of performing iterative sector optimization in an illustrative embodiment.

FIG. 7A is a flow chart illustrating a method 700 of performing iterative sector optimization in an illustrative embodiment. The steps of method 700 will be described with reference to load management optimization system 150 in FIG. 5, but those skilled in the art will appreciate that method 700 may be performed in other systems.

Iterative sector optimization is performed on a sector 202 of a RAN 120, such as a sector identified in step 602 in FIG. 6A. Optimization manager 514 identifies a plurality of cells 401-402 overlapping at the sector 202 (step 702). In this embodiment, it is assumed that cells 401-402 overlap at sector 202 for the sake of clarity of this description, but more than two cells may overlap as shown in FIGS. 4A and 4B. Iterative sector optimization as described below is performed for the sector 202 in successive iterations, referred to herein as optimization iterations (e.g., each iteration comprising one week). An optimization iteration is an interval in which data to be used for optimization is collected and in which the settings calculated from optimization are applied to RAN 120. The status of RAN 120 is read at the beginning of an optimization iteration in receiving the sector information 620. The status indicates static configuration parameters, such as the carrier frequencies of the cells 401-402, and dynamic parameters, such as the number of active users and user throughput of cells 401-402.

Optimization manager 514 is configured to determine a load distribution among the cells 401-402 that results in a maximum aggregated user throughput for the sector 202 for the current optimization iteration. The aggregated user throughput of a sector 202 is the sum of the user throughput for each of the cells 401-402 overlapping at the sector 202, as follows:

Aggregated UserTput$_{Sector}$=
(ActiveUsers$_{Cell-1}$*UserTput$_{Cell-1}$)+
(ActiveUsers$_{Cell-2}$*UserTput$_{Cell-2}$)+ . . . (ActiveUsers$_{Cell-n}$*UserTput$_{Cell-n}$)

For the current optimization iteration, optimization manager 514 determines a total number of active users in the sector 202 (step 708) at a moment or point in time during the optimization iteration, such during the busy hour as is described in more detail below. An "active" user refers to a UE 110 that is in connected mode, and is scheduled for a user data transaction (i.e., data is loaded in a buffer for transmission to or from the UE 110). Optimization manager 514 may determine the actual number of active users per cell 401-402, and sum the actual number of active users per cell 401-402 to obtain the total number of active users in the sector 202.

Optimization manager 514 then determines a target number of users per cell 401-402 that maximizes the aggregated user throughput of the sector 202 (step 710). The sum of the target number of users per cell 401-402 is equal to the total number of active users in the sector 202, as determined in step 708. For example, assume that the total number of active users in the sector 202 is twenty four. Of the twenty four active users, optimization manager 514 determines a target number of users for cell 401 and a target number of users for cell 402 that maximizes the aggregated user throughput of the sector 202.

The target number of users per cell 401-402 indicates an optimized traffic split between the cells 401-402. The optimized traffic split represents an optimal distribution of active users among the cells 401-402 overlapping the sector 202 as a function of user throughput performance. The optimized traffic split indicates an optimized traffic percentage or proportion of traffic for each of the cells 401-402. For example, the optimized traffic split may indicate an optimized traffic percentage of "33%" for cell 401 and "67%" for cell 402.

Optimization manager 514 then determines, adapts, or modifies recommended load distribution parameters 622 for the sector 202 based on the target number of users per cell 401-402 (step 712). The recommended load distribution parameters 622 may include percentage values, percentage weights, or some other values or indicators used for load management. The recommended load distribution parameters 622 may also include a target number of users per cell, a traffic split, or other information. Load distribution parameters may be initially assigned for a sector 202, and may be adapted or adjusted with each optimization iteration. Thus, in determining the recommended load distribution parameters 622, optimization manager 514 may adjust or adapt load distribution parameters initially assigned to the sector 202 (such as for the first iteration), or adapt the load distribution parameters from a prior optimization iteration. Optimization manager 514 may then apply the recommended load distribution parameters 622 (as determined in the current optimization iteration) in sector 202 of RAN 120 (step 714). In one embodiment, optimization manager 514 may provide, send, or transmit (e.g., automatically) the recommended load distribution parameters 622 to RAN 120, such as through network interface component 502, so that users are distributed among the cells 401-402 based on the recommended load distribution parameters 622. For example, optimization manager 514 may automatically transmit control signals to RAN 120 with the recommended load distribution parameters 622. In another embodiment, optimization manager 514 may send the recommended load distribution parameters 622 to network management system 140, and/or another system, which operates to apply the recommended load distribution parameters 622 in RAN 120. For example, optimization manager 514 may automatically transmit control signals to network management system 140 with the recommended load distribution parameters 622.

It is noted that optimization manager 514 may selectively apply the recommended load distribution parameters 622 in step 714. For example, there may be instances where the recommended load distribution parameters 622 do not result in a positive yield in aggregated user throughput at the sector 202. In such scenarios, optimization manager 514 may mask the recommended load distribution parameters 622 determined in the current optimization iteration, and maintain the load distribution parameters from a prior optimization iteration, which is described in more detail below.

In one embodiment, load curve manager 512 identifies load curves for the cells 401-402 (optional step 704). As described above, a load curve is a performance model for a cell that indicates the relationship between user throughput for a cell and the number of active users in the cell. In one embodiment, load curve manager 512 may generate the load curves for each of the cells 401-402 as indicated in FIG. 8. Each cell 401-402 has its own individual user throughput profile at various load points dependent on the frequency, bandwidth, signal level coverage, neighbor interference, user geographical distribution, and user traffic profile, which is represented by a load curve. FIG. 8 is a flow chart illustrating a method 800 of generating a load curve for a cell 401 in an illustrative embodiment. Load curve manager 512 determines or calculates the user throughput for the cell 401 during an aggregation period (step 802), such over one hour. The user throughput is the amount of data (i.e., packets) received for Downlink (DL) communications or transmitted for Uplink (UL) communications by active users on average within a cell. For example, the user throughput for a cell may be expressed as follows:

$$\text{User throughput} = \frac{\sum_1^n d}{\sum_1^n t}, [\text{Mbps}],$$

where d=data volume transmitted in the cell, t=the total transmission time (including scheduling delays) in the cell, and n=the number of users transmitting data in the cell.

Load curve manager 512 also determines the number of active users in the cell 401 during the aggregation period (step 804). The number of active users is the average number of parallel users (i.e., with data in buffer) within or served by the cell 401 during the aggregation period. Load curve manager 512 then adds a sample on a user throughput plot (e.g., a scatter plot) based on the user throughput and the number of active users determined for the cell 401 during the aggregation period (step 806).

Figure 9:
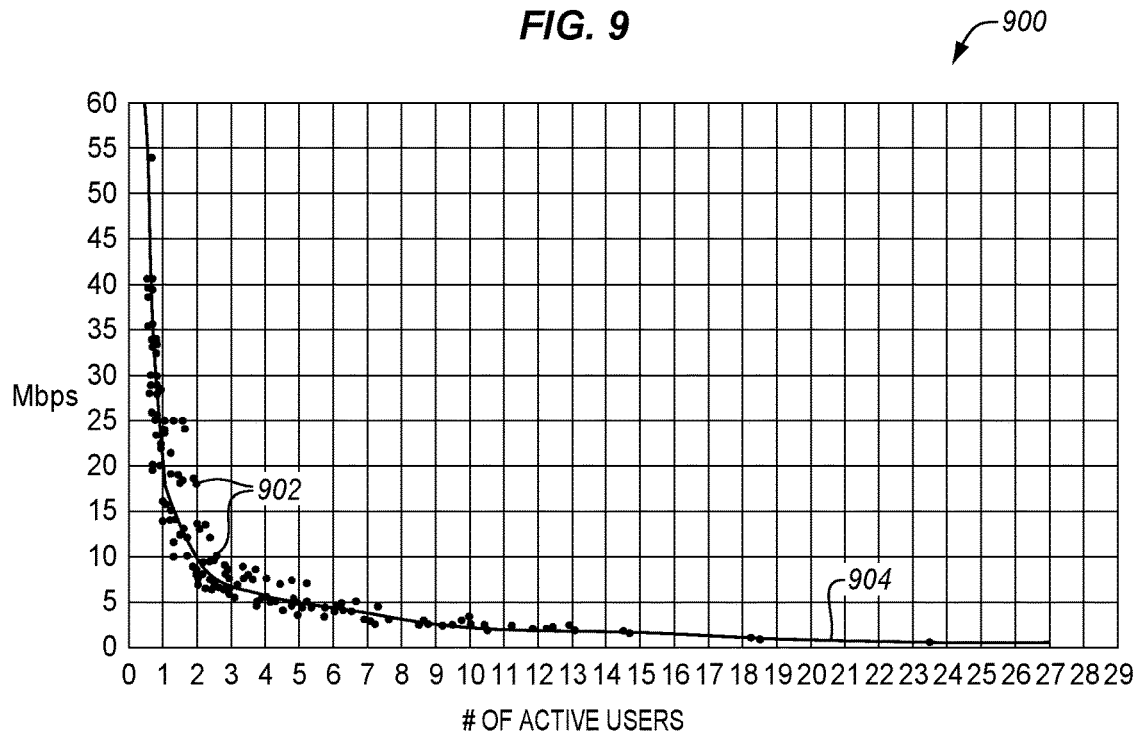
FIG. 9 illustrates a user throughput plot in an illustrative embodiment.

Load curve manager 512 repeats steps 802-806 over a collection period that is longer than the aggregation period to obtain a plurality of samples (i.e., a data set) on the user throughput plot. FIG. 9 illustrates a user throughput plot 900 in an illustrative embodiment. User throughput plot 900 has user throughput as the Y-axis (in Mbps), and the number of active users as the X-axis. Each sample 902 on user throughput plot 900 represents the user throughput of the cell 401 in relation to the number of active users during an aggregation period (e.g., one hour). After the collection period in FIG. 8, load curve manager 512 generates a load curve for the cell 401 based on the user throughput plot 900 (step 808). FIG. 9 shows a load curve 904 determined from user throughput plot 900. Load curve 904 illustrates the relationship or dependency between user throughput and the number of active users in cell 401. Load curve manager 512 may use a regression algorithm or another technique to generate the load curve 904. For example, user throughput plot 900 may be regressed with the following algorithm:

$$y = \text{Min}(Y^* e^{-((x-\delta)^\gamma/\beta)}, \kappa)$$

where x=the number of active users, y=user throughput, δ=sample minimum x (delta shift), κ=sample maximum γ (cap value), γ=convergence, β=bend, and Y=maximum y value (user throughput).

Load curve 904 may be dependent on the RF environment (e.g., user location and subsequent interference levels (SINR)), and on frequency, bandwidth, and Multiple-Input and Multiple-Output (MIMO) mode. The RF environment is difficult to anticipate, but the frequency, bandwidth, and MIMO mode has a calculable impact on load curve 904 when changed. Thus, impact may be forecasted and load curve manager 512 may rescale load curve 904 according to the frequency, bandwidth, and MIMO mode for the cell 401-402.

The dependency of user throughput to number of active users may be unique for each cell 401-402. Thus, load curve manager 512 may perform method 800 for each cell 401-402 (along with other cells within RAN 120) to generate a load curve 904 specific to each cell 401-402. Load curve manager 512 may store the load curves 904, such as in memory 532 or a database.

There may be situations where the data set for a cell 401-402 does not reach statistical validity due to low load. Thus, load curve manager 512 may define one or more thresholds for a data set before a load curve 904 is generated and considered valid. One threshold may be a Physical Resource Block (PRB) utilization threshold, where PRB utilization in a cell 401-402 has to exceed the PRB utilization threshold (e.g., PRB utilization >50%). Another threshold may be an active user threshold, where the number of active users in a cell 401-402 has to exceed the active user threshold (e.g., number of active users >1). Other thresholds may also be defined. Load curve manager 512 may generate a load curve 904 for a cell 401-402 when the thresholds are met, as in step 808 of method 800. When one or more thresholds are not met, load curve manager 512 may assign a load curve 904 to a cell 401-402 based on predetermined load curves generated for RAN 120. For example, load curve manager 512 may generate network models by categorizing samples of cells 401-402 in RAN 120 according to frequency band, bandwidth, number of codewords for MIMO, etc. Load curve manager 512 may use the categorized samples to generate network models, which may be assigned to low-loaded cells 401-402 of a similar kind.

Further in FIG. 7A, optimization manager 514 may generate aggregated user throughput curves for the cells 401-402 based on the load curves 904 for cells 401-402 (optional step 706). In general, the aggregated user throughput for a cell at any given hour is defined as the product of the number of active users and its corresponding user throughput. Thus, optimization manager 514 may generate the aggregated user throughput curves for the cells 401-402 based on the following formula:

Aggregated UserTput$_{Cell-1}$=
ActiveUsers$_{Cell-1}$*UserTput$_{Cell-1}$

Figure 10:
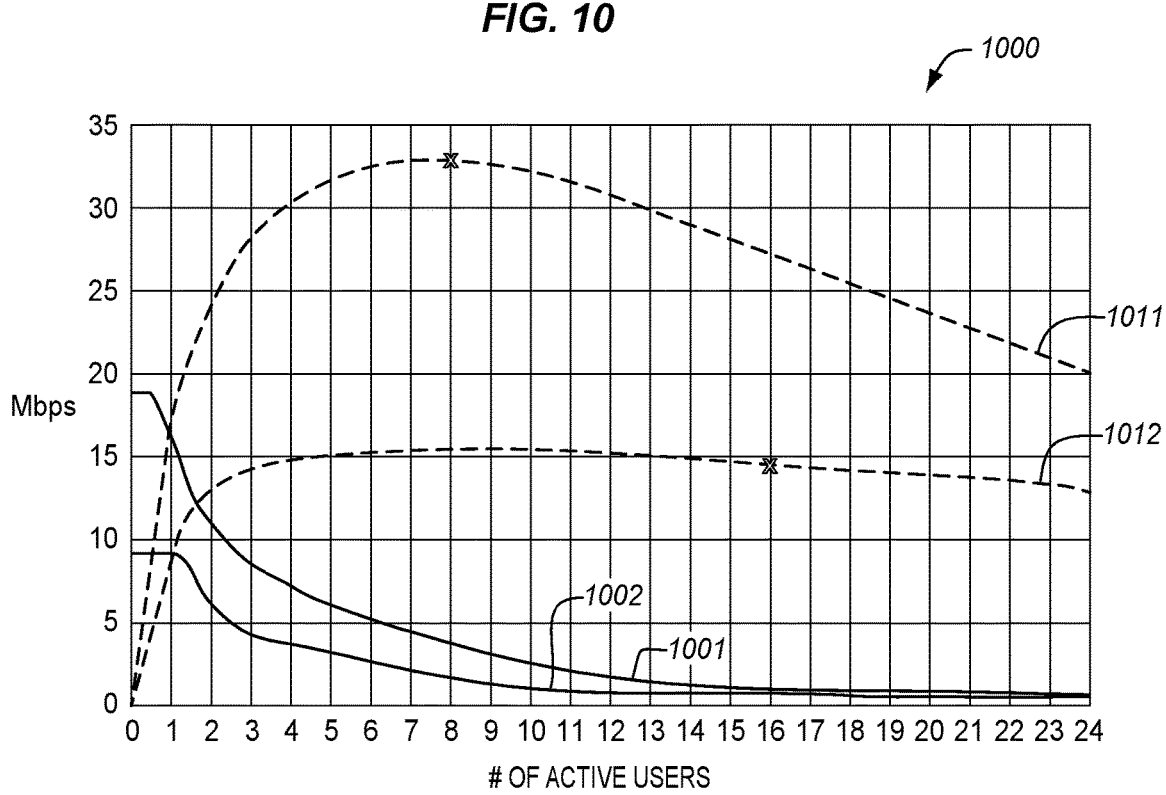
FIG. 10 is a graph illustrating aggregated user throughput curves for cells in an illustrative embodiment.

FIG. 10 is a graph 1000 illustrating aggregated user throughput curves for cells in an illustrative embodiment. As with FIG. 9, graph 1000 has user throughput as the Y-axis (in Mbps), and the number of active users as the X-axis. Graph 1000 shows load curves 1001-1002 for two cells 401-402 of a sector 202 (it is noted that two cells 401-402 are discussed for simplicity). Graph 1000 also shows aggregated user throughput curves 1011-1012 for cells 401-402, respectively, which were calculated based on the formula above. Optimization manager 514 may use the aggregated user throughput curves 1011-1012 to determine the target number of users per cell 401-402 that maximizes an aggregated user throughput of the sector 202. Looking at FIG. 10 for example, a maximum aggregated user throughput for the sector 202 may be found when eight users are served by cell 401, and sixteen users are served by cell 402 (indicated by an X on graph 1000).

The process of determining an optimized traffic split among cells 401-402 of a sector 202 may be a continuous process as indicated in FIG. 7A. At the end of the current optimization iteration (e.g., one week), optimization manager 514 enters the next optimization iteration to determine a target number of users per cell 401-402 that maximizes the aggregated user throughput of the sector 202 for the next optimization iteration. Thus, optimization manager 514 continually determines or adapts recommended load distribution parameters 622 for the sector 202 in this embodiment. This may be beneficial when user behavior changes over time, such as monthly, seasonally, etc.

Figure 7B:
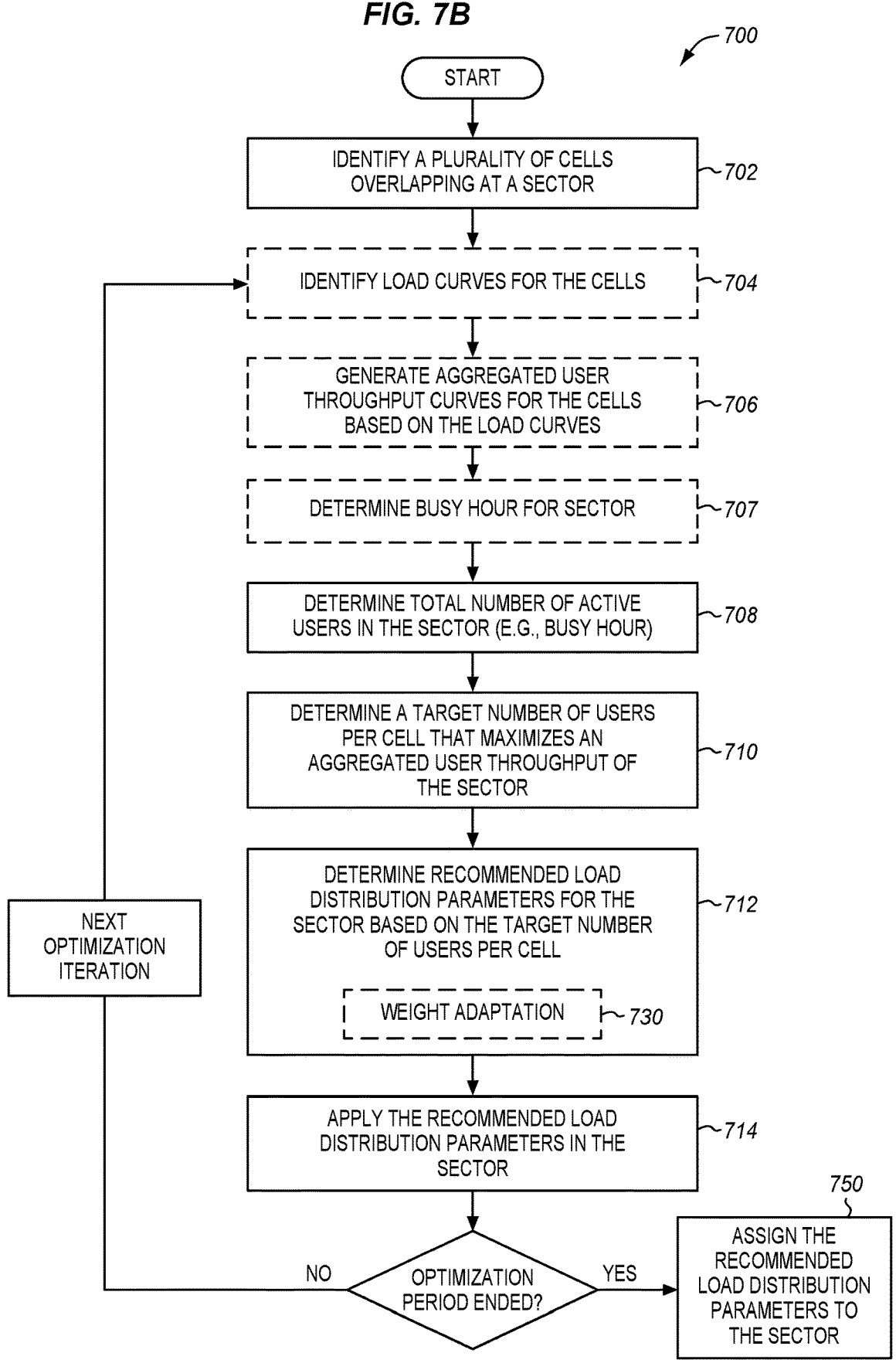
FIG. 7B is a flow chart illustrating another method of performing iterative sector optimization in an illustrative embodiment.

In another embodiment, iterative sector optimization may be performed as a campaign over an optimization period (such as two months, three months, etc.). FIG. 7B is a flow chart illustrating another method of performing iterative sector optimization in an illustrative embodiment. The steps in FIG. 7B that are similar to the steps in FIG. 7A are shown with the same reference number and are not discussed for the sake of brevity. In this embodiment, after optimization manager 514 determines the recommended load distribution parameters 622 for the current optimization iteration and provides the parameters to another system (steps 712-714), optimization manager 514 determines whether the optimization period ends. When the optimization period has not ended, optimization manager 514 enters the next optimization iteration. When the optimization period ends, optimization manager 514 assigns the recommended load distribution parameters 622 to the sector 202 (step 750). Because multiple iterations are performed during the optimization period, optimization manager 514 makes successive refinements to the recommended load distribution parameters 622 and adapts to changing conditions (e.g., spatial user distribution and load) to converge on a set of recommended load distribution parameters 622 that are considered "optimized" for sector 202. These optimized load distribution parameters may be used by RAN 120 for sector 202, and for other sectors that are similar.

This iterative process in FIGS. 7A and 7B provides a technical benefit in that optimization manager 514 determines an optimized traffic split for a sector 202 so that traffic is steered between cells 401-402 in a way that maximizes user throughput for the sector 202. This acts to enhance the user experience within the sector 202.

In one embodiment, optimization manager 514 may determine a busy hour (BH) for the sector 202 (optional step 707) when performing sector throughput optimization. The busy hour is generally a sixty-minute period during which a sector experiences the maximum total traffic load in a given twenty-four hour period. The maximum total traffic load may be calculated based on PRB utilization, user throughput, or other metrics. For example, optimization manager 514 may use the following algorithm to determine the busy hour for sector 202 based on PRB utilization and number of users:

$$\text{Daily } BH = \text{argmax} \sum\nolimits_{i\text{-th cell of sector}} NumUsers_i * PRBUtilization_i$$

The optimization techniques discussed herein may have a maximum effect during the busy hour of a sector 202. Thus, optimization manager 514 may determine the target number of users per cell 401-402 that maximizes the aggregated user throughput of the sector 202 during the busy hour. For instance, optimization manager 514 may identify the total number of active users in the sector 202 (for step 708 of FIGS. 7A and 7B) during the busy hour. The number of active users of a cell 401-402 may be determined as an average of the number of active users in that cell 401-402 at the busy hour during the optimization iteration (e.g., one week). For example, the number of active users of a cell 401-402 at the busy hour may be expressed as:

$$NumUsers(bh)_i = avg_{optimization\ Iteration}((NumUsers\ (Daily\ BH)_i)$$

The total number of active users in a sector 202 (for step 708) may therefore be determined as the sum of the average number of active users per cell 401-402 overlapping the sector 202 during the busy hour.

In method 700, optimization manager 514 attempts to optimize the distribution of users per cell 401-402 of the sector 202. To do so, optimization manager 514 may use a variety of optimization schemes to determine the optimized balance of users (i.e., step 710 of FIGS. 7A and 7B). For example, optimization manager 514 may perform an unbounded optimization technique, where no domain-specific bounds are considered, or a bounded optimization technique, where one or more domain-specific bounds are considered. It may be assumed that an optimization technique is performed during an optimization iteration, such as several days (e.g., one week). It may also be assumed that data is collected hourly during the optimization iteration.

Unbounded Optimization

Figure 11:
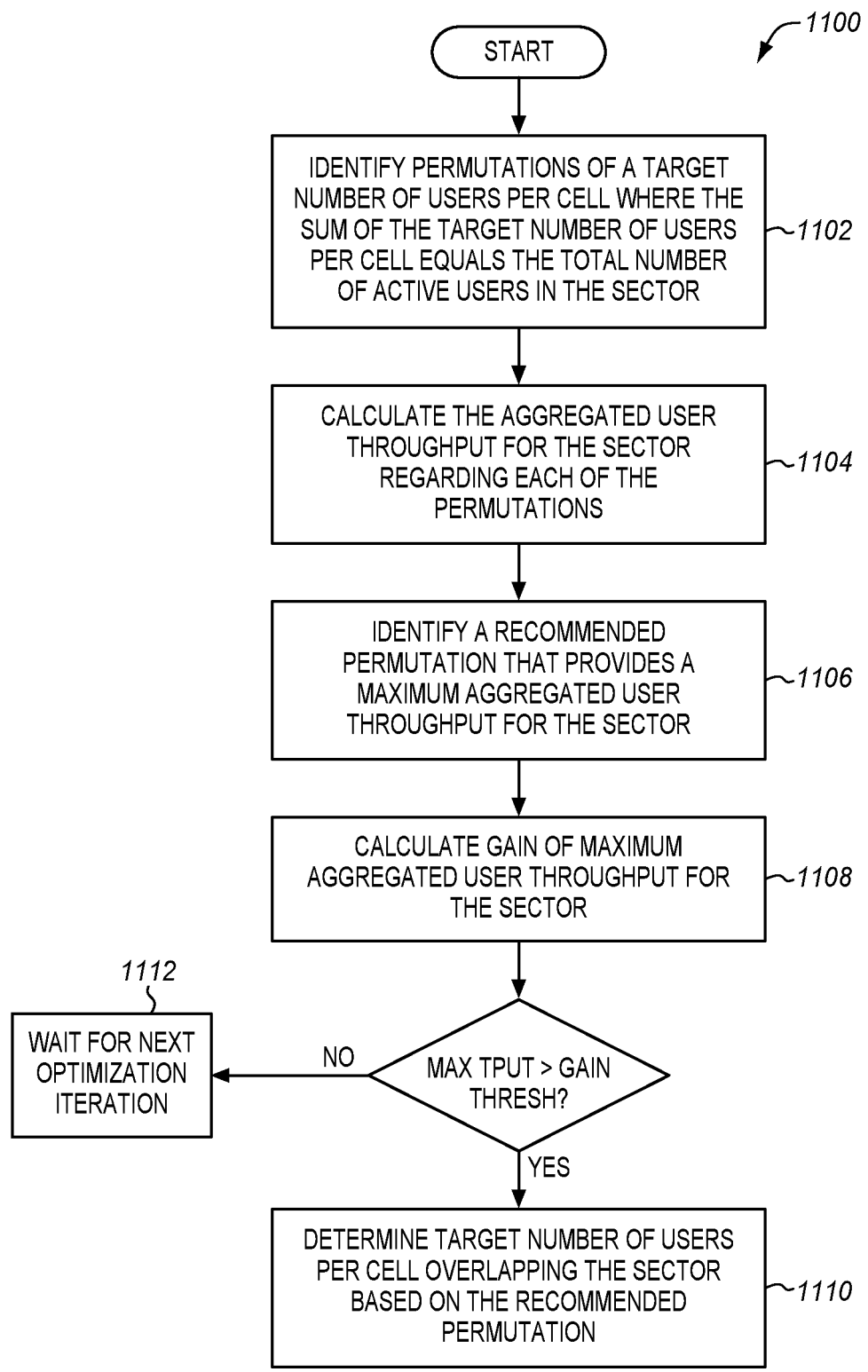
FIG. 11 is a flow chart illustrating an unbounded optimization method in an illustrative embodiment.

FIG. 11 is a flow chart illustrating an unbounded optimization method 1100 in an illustrative embodiment. With the total number of active users in the sector 202 determined, optimization manager 514 identifies permutations of a target number of users per cell 401-402 where the sum of the target number of users per cell 401-402 equals the total number of active users in the sector 202 (step 1102). For example, if the total number of active users in the sector 202 is twenty four and there are two cells 401-402 overlapping the sector 202, then optimization manager 514 identifies each of the permutations of the target number of users in cell 401 and target number of users in cell 402 that equals a total of twenty four. Optimization manager 514 calculates the aggregated user throughput for the sector 202 regarding each of the permutations (step 1104). Optimization manager 514 then identifies a recommended permutation that provides a maximum aggregated user throughput for the sector 202 (step 1106). The recommended permutation indicates the target number of users per cell 401-402 that maximizes the aggregated user throughput of the sector 202 (see also, step 710 of FIGS. 7A and 7B). Thus, optimization manager 514 may use the percentage or ratio of the recommended permutation to determine the optimized traffic split, and determine the recommended load distribution parameters 622 for the sector 202 accordingly.

To identify the permutations, optimization manager 514 may create a two-dimensional optimization table of cells 401-402 of the sector 202 (i.e., columns), and target number of users (i.e., rows). The columns of the optimization table indicate the cells 401-402 overlapping sector 202, and the rows of the optimization table indicate a number of users. To fill in the fields of the optimization table, optimization manager 514 calculates the aggregated user throughput per cell 401-402 based on the load curve 904 for each cell 401-402 and the number of users for the corresponding row. Thus, the fields of the optimization table indicate the aggregated user throughput (Mbps) per cell 401-402 and per number of users. Using the constraint of the total number of active users in the sector 202, optimization manager 514 is able to identify each permutation from the optimization table.

Figure 12:
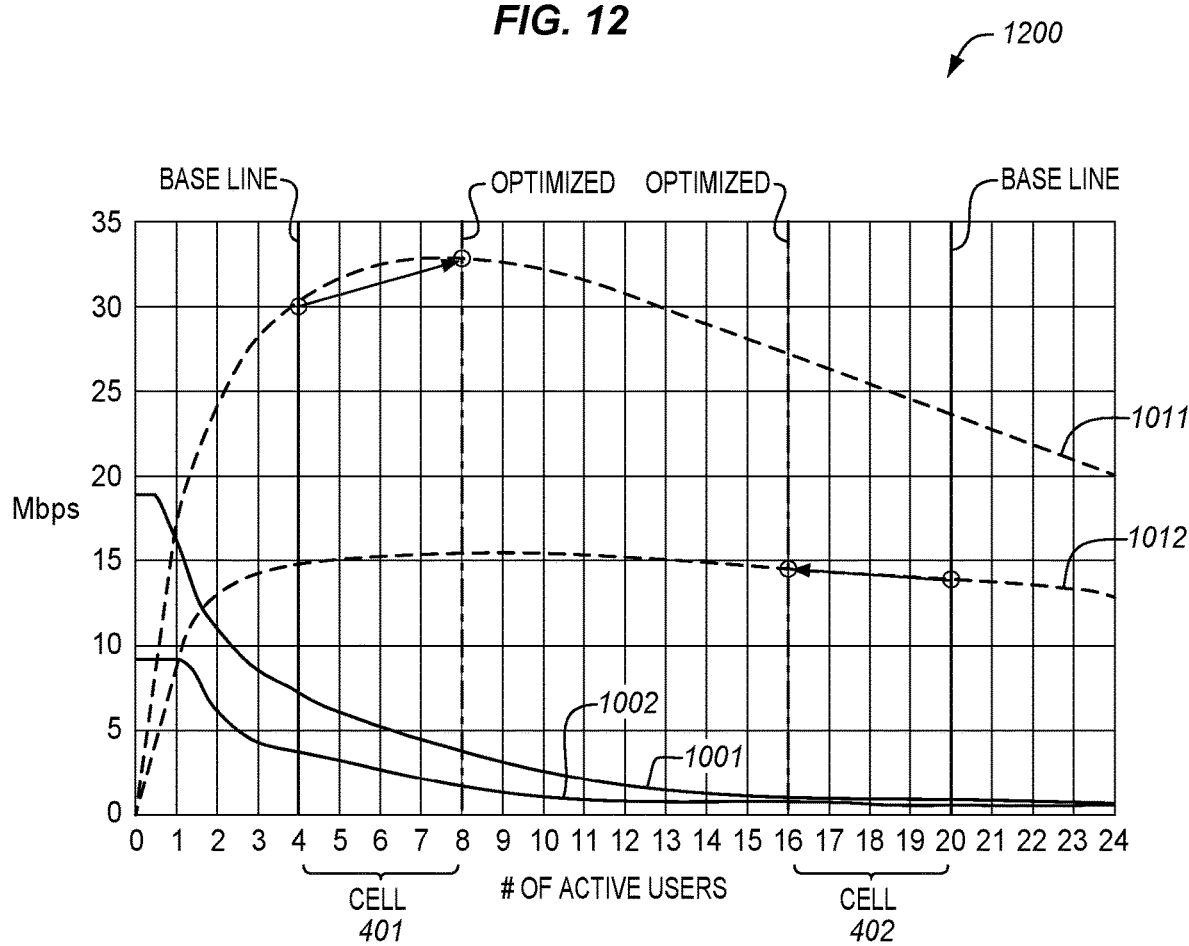
FIG. 12 is a graph illustrating aggregated user throughput curves in an illustrative embodiment.

Optimization manager 514 may calculate the gain of the maximum aggregated user throughput for the sector 202 provided by the recommended permutation (step 1108). Optimization manager 514 may calculate the gain based on a base line aggregated user throughput for the sector 202. FIG. 12 is a graph 1200 illustrating aggregated user throughput curves in an illustrative embodiment. Graph 1200 is similar to graph 1000 in FIG. 10, and shows a base line number of users per cell 401-402. In this example, the base line number of users in cell 401 is four, and the base line number of users in cell 402 is twenty. Based on this base line number of users, the aggregated user throughput for the sector 202 would be approximately 43 Mbps (i.e., the sum of 30 Mbps for cell 401 and 13 Mbps for cell 402). Also in this example, it may be assumed that the recommended permutation that provides the maximum aggregated user throughput for the sector 202 is eight users in cell 401 and sixteen users in cell 402. In other words, the recommendation is to move four users from cell 402 to cell 401 to achieve maximum aggregated user throughput for the sector 202. For this recommended permutation, the aggregated user throughput for the sector 202 would be approximately 46 Mbps (i.e., the sum of 32 Mbps for cell 401 and 14 Mbps for cell 402). Optimization manager 514 may calculate the gain for the recommended permutation by comparing the aggregated user throughput for the base line number of users per cell 401-402 and the aggregated user throughput for the recommended permutation. In this example, the gain would be about 7% (100*((46/43)−1)).

When the gain determined for the recommended permutation exceeds a gain threshold, optimization manager 514 determines the target number of users per cell 401-402 based on the recommended permutation (step 1110, similar to step 710 in FIGS. 7A and 7B). In other words, the recommended permutation indicates an optimized traffic split between the cells 401-402 overlapping the sector 202. When the gain does not exceed the gain threshold, optimization manager 514 may not determine a target number of users per cell 401-402 during the current optimization iteration, and waits for the next optimization iteration (step 1112).

For the optimization technique discussed above, optimization manager 514 may determine the base line number of users per cell 401-402 during the busy hour for the sector 202 to calculate the gain of a recommended permutation (for step 1108). For example, the average number of active users in cell 401 at the busy hour, and the average number of active users in cell 402 at the busy hour may be used as the base line for comparison to the gain achieved by the recommended permutation (for step 1108).

Bounded Optimization

Another optimization technique is a bounded optimization. Due to RF constraints in RAN 120, it may not be possible to steer traffic from one cell to another according to a permutation that results in the maximum aggregated user throughput. For the example in FIG. 12, the recommendation was to move four users from cell 402 to cell 401. However, it may not be feasible to move this many users between cells 401-402 due to RF constraints, such as coverage, interference, CQI, etc., and spatial distribution of users in terms of distance to a base station 122 (i.e., antenna).

Figure 13:
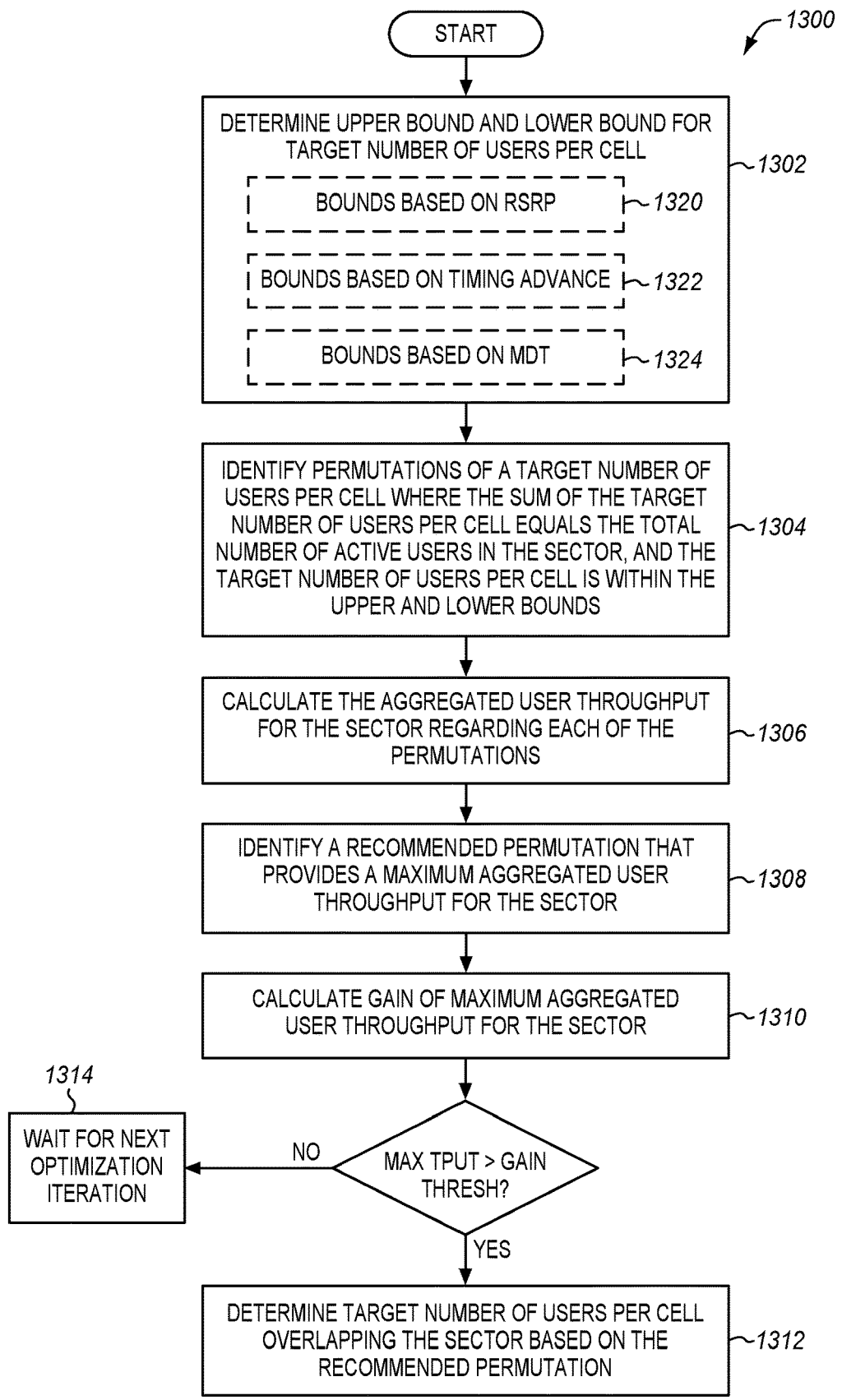
FIG. 13 is a flow chart illustrating a bounded optimization method in an illustrative embodiment.

FIG. 13 is a flow chart illustrating a bounded optimization method 1300 in an illustrative embodiment. Optimization manager 514 determines an upper bound and a lower bound for the target number of users per cell 401-402 (step 1302). The upper and lower bounds are determined based on performance metrics of each cell 401-402 overlapping the sector 202. For example, the lower bound and upper bound (per cell) may be represented as follows: lowNumUsers$(BH)_i$ and highNumUsers$(BH)_i$.

The bounds may be defined as:

f_lower(DeltaNumUsers(i,j)) in [0,1], and f_upper (DeltaNumUsers(i,j)) in [0,1]

The lower bound may be defined as:

lowerNumUsers$(BH)_i$=NumUsers$(BH)_i$−NumUsers $(BH)_i$ Max$_j$(ΔNumUsers(i,j))

This describes the lower bound imposed by the $j^{th}$ cell that can take more users from the $i^{th}$ cell. The variable (Δ NumUsers(i,j)) is the number of users that can be moved from $i^{th}$ cell to the $j^{th}$ cell due to domain considerations, such as coverage, interference, and CQI, that influence selection of modulation and thus throughput, user distribution distance, cell range, etc.

The upper bound may be defined as:

upperNumUsers$(BH)_i$=NumUsers$(BH)_i$+NumUsers $(BH)_j$ Max$_j$(1−ΔNumUsers(i,j))

The variable (1−Δ NumUsers(i,j)) is the number of users that can be moved from the $j^{th}$ cell to $i^{th}$ cell due to domain considerations, such as coverage, interference, and CQI that influence selection of modulation and thus throughput, user distribution distance, cell range, etc.

The definition of Δ NumUsers(i,j) may be expressed as:

$$\Delta NumUsers\ (i,j) = \begin{bmatrix} 0 & \% \text{ that } i^{th} \text{ cell cannot be transferred to } j^{th} \text{ cell} & \ldots \\ \ldots & 0 & \ldots \\ \ldots & \ldots & 0 \end{bmatrix}$$

The values in above matrix are percentages.

Optimization manager 514 identifies permutations of a target number of users per cell 401-402 where the sum of the target number of users per cell 401-402 equals the total number of active users in the sector 202, and the target number of users per cell 401-402 is within the upper and lower bounds per cell 401-402 (step 1304). Optimization manager 514 calculates the aggregated user throughput for the sector 202 regarding each of the permutations (step 1306), and identifies a recommended permutation that provides a maximum aggregated user throughput for the sector 202 (step 1308). The recommended permutation indicates a percentage or ratio of users per cell that results in a maximum aggregated user throughput for the sector 202 based on the constraints for the bounded optimization technique. Optimization manager 514 may calculate the gain of the maximum aggregated user throughput for the sector 202 provided by the recommended permutation (step 1310). When the gain determined for the recommended permutation exceeds a gain threshold, optimization manager 514 determines the target number of users per cell 401-402 based on the recommended permutation (step 1312, similar to step 710 in FIGS. 7A and 7B). In other words, the recommended permutation indicates an optimized traffic split between the cells 401-402 overlapping the sector 202. When the gain does not exceed the gain threshold, optimization manager 514 may not determine a target number of users per cell 401-402 during the current optimization iteration, and waits for the next optimization iteration (step 1314).

The upper and lower bounds may be determined based on Reference Signal Received Power (RSRP) of the cells 401-402 (coverage), timing advance (spatial user distribution), a combination of RSRP and timing advance, and/or other factors. In one embodiment, optimization manager 514 may determine the upper and lower bounds of the target number of users per cell 401-402 based on RSRP (optional step 1320). The RSRP is the average power received from a single reference signal within a frequency band of a cell 401-402. The following is a matrix describing the average ARSRP between two cells 401-402 at a UE receiver:

$$\Delta RSRP(i, j)[dB] = \begin{bmatrix} 0 & \Delta RSRP(j_{th} - i_{th}) & \dots \\ \dots & 0 & \dots \\ \dots & -\Delta RSRP(j_{th} - i_{th}) & 0 \end{bmatrix}$$

In this matrix, the $i_{th}$ cell is the serving cell, and and $j_{th}$ cell is the target cell.

The variable $\Delta RSRP(i,j)[dB]$ is comprised of two components:

$$\Delta RSRP(i,j)[dB] = \Delta EiRP(i,j)[dB] + \Delta PathLoss(i,j)[dB]$$

with:

$$\Delta EiRP(i, j)[dB] = \begin{bmatrix} 0 & \Delta EiRP(j_{th} - i_{th}) & \dots \\ \dots & 0 & \dots \\ \dots & -\Delta EiRP(j_{th} - i_{th}) & 0 \end{bmatrix}$$

and $$EiRP = RSPower - LineLosses + AntennaGain$$

where RSPower [dBm] is the Reference Signal Output Power of a base station, LineLosses [dB] are the aggregated attenuation between the base station and antenna, and AntennaGain [dB] is the gain of the antenna.

The path loss may be expressed as follows using the COST Hata model:

$$\Delta PathLoss(i, j)[dB] = \begin{bmatrix} 0 & \Delta PathLoss(j_{th} - i_{th}) & \dots \\ \dots & 0 & \dots \\ \dots & -\Delta PathLoss(j_{th} - i_{th}) & 0 \end{bmatrix}$$

As an example, the matrix for $\Delta RSRP(i,j)[dB]$ may be calculated as follows:

$$\Delta RSRP(i, j)[dB] = \begin{bmatrix} 0.0 & -2.6 & -19.8 & -20.6 & -34.5 \\ +2.6 & 0.0 & -17.2 & -18.0 & -31.9 \\ +19.8 & +17.2 & 0.0 & -0.8 & -14.7 \\ +20.6 & +18.0 & +0.8 & 0.0 & -13.9 \\ +34.5 & +31.9 & +14.7 & +13.9 & 0.0 \end{bmatrix}$$

The i,j indices represent Carrier Frequency order from the lowest one to the highest one and inversely with respect to cell range. For instance i=j=0 is a 700 Mhz coverage layer (larger cell range or coverage cell) and i=j=3 represents a 2300 Mhz coverage layer (smaller cell range or capacity cell).

Considering the constraints from a handover (HO) strategy, a handover matrix may be defined with handover thresholds (i.e., as A5_HO_thr (e.g. −116 dBm) and Margin_HO_thr) as follows:

$$\Delta HO \text{ Power }(i, j)[dB] = \begin{bmatrix} 0 & A5\_HO\_thr + Margin\_HO\_thr & \dots \\ \dots & 0 & \dots \\ \dots & A5\_HO\_thr + Margin\_HO\_thr & 0 \end{bmatrix}$$

A coverage matrix may be calculated as follows:

$$\Delta Coverage(i, j)[dB] =$$

$$\Delta HO \text{ Power}(i, j)[dB] - \Delta RSRP(i, j)[dB] = \Delta Coverage(i, j)[dB] =$$

$$\begin{bmatrix} 0 & A5\_HO\_thr + Margin\_HO\_thr - Delta \text{ Power}(j_{th} - i_{th}) & \dots \\ \dots & 0 & \dots \\ \dots & A5\_HO\_thr + Margin\_HO\_thr + Delta \text{ Power}(j_{th} - i_{th}) & 0 \end{bmatrix}$$

Figure 14:
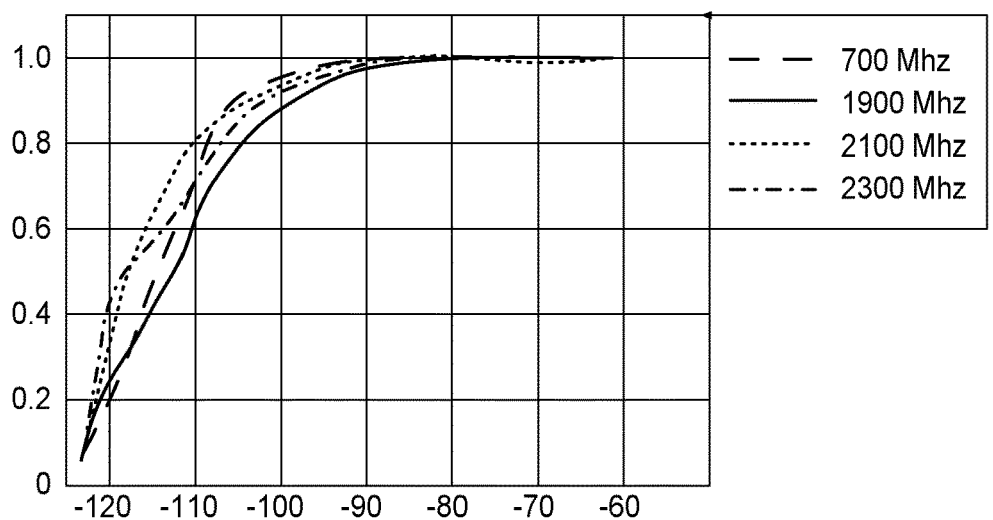
FIG. 14 is an RSRP histogram for a network in an illustrative embodiment.

The approach is that given a user camped on $i^{th}$ cell subject to a certain coverage (RSRP), the user is allowed to move to the $j^{th}$ cell if the RSRP of the $j^{th}$ cell is larger than the handover threshold (A5_HO_thr) by a given margin (Margin_HO_thr). The number of users camped on the $i^{th}$ cell that can respect the above condition is determined. This may be done in different ways according to the kind of measures available in the network under optimization. For example, if the RSRP/RSRQ histogram measures are available, the following procedure may be adopted. The cumulative distribution of the number of observations with an RSRP less than or equal a given value is Cum(RSRP_histogram($bin_k$)). RSRP_histogram($bin_k$) is collected hourly. The cumulative can be calculated according to different options: (1) Cum(RSRP_histogram($bin_k$)) is calculated cumulating all {RSRP_histogram($bin_k$)} over the optimization iteration, or (2) Cum(RSRP_histogram($bin_k$)) is calculated cumulating all {RSRP_histogram($bin_k$)} over the Busy Hour of the optimization iteration. The cumulative percentage of users is assumed to be equal to the cumulative number of observations. Cum(RSRP_histogram($bin_k$)) is reported hereafter for the frequency layers in a sector 202. FIG. 14 is an RSRP histogram 1400 for a network in an illustrative embodiment. In order to apply the method, the serving cell is selected (e.g., i=0), the target cell is selected (e.g., j=1), the $\Delta$ Coverage(i,j)[dB] is determined, and Cum(RSRP_histogram($bin_k$) (==$\Delta$ Coverage(i,j)[dB])) is read, which provides the percentage of users that cannot be moved from $i^{th}$ cell to the $j^{th}$ cell in a stable manner according to the handover strategy and corresponds to $\Delta$ NumUsers(i,j).

Figure 15:
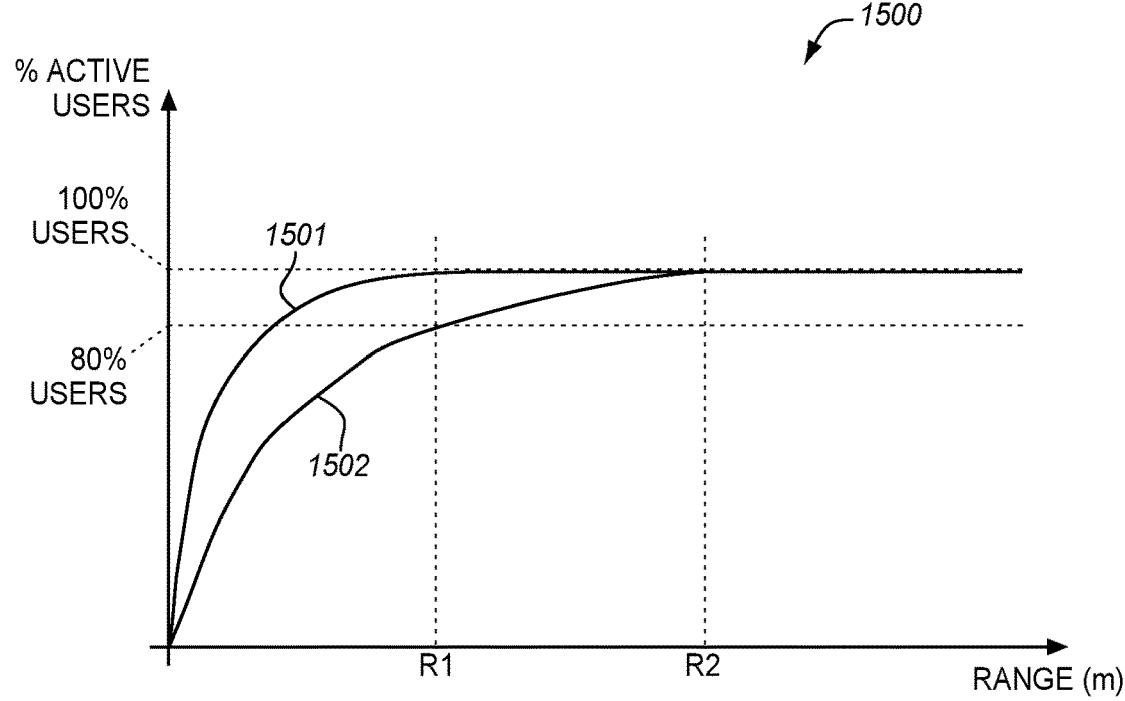
FIG. 15 is a graph illustrating timing advance histograms in an illustrative embodiment.

In another embodiment, optimization manager 514 may determine the upper and lower bounds of the number of target users per cell 401-402 based on timing advance (optional step 1322 in FIG. 13). Timing advance is a negative offset, at a UE, between the start of a received downlink subframe and a transmitted uplink subframe. Timing advance histograms provide a spatial distribution of users as a function of the distance from an antenna. FIG. 15 is a graph 1500 of timing advance histograms in an illustrative embodiment. The X-axis of graph 1500 is a range (meters) from an antenna, and the Y-axis is a percentage of active users. R1 is considered a smaller cell having a smaller cell radius, and R2 is considered a larger cell having a larger cell radius. Optimization manager 514 may calculate a cumulated number of users for the smaller cell (CUM (ctr(j), R1)), which is shown as curve 1501. Optimization manager 514 may also calculate a cumulated number of users for the larger cell (CUM(ctr(j), R2)), which is shown as curve 1502. Optimization manager 514 also determines a reference percentage (e.g., 95th percentile). Optimization manager 514 determines the abscissa for the smaller cell at the reference percentage (indicated by R1 in FIG. 15). Optimization manager 514 then determines where the abscissa for the smaller cell intercepts the curve for the larger cell. The ordinate where the abscissa for the smaller cell intercepts the curve for the larger cell represents the maximum percentage of users that can be moved from the larger cell to the smaller cell. In the example shown in FIG. 15, about 80% of the users may be moved to the larger cell. This percentage may be used to determine the upper and lower bounds.

In another embodiment, optimization manager 514 may determine the upper and lower bounds of the target number of users per cell 401-402 based on timing advance (optional step 1322 of FIG. 13) and the RSRP of the cells 401-402 (optional step 1320).

In yet another embodiment, optimization manager 514 may determine the upper and lower bounds of the target number of users per cell 401-402 based on Minimization of Drive Test (MDT) measurements (optional step 1324 of FIG. 13). The geo-referenced MDT measurements allows for the creation of both a spatial distribution of the UEs (i.e., of the users) and a simplified coverage map for each of the cells 401-402. Both may be used to produce a detailed estimation of the probability that users from one cell 401-402 can be moved to another cell 401-402. Such an estimation is then usable to derive proper bounds for the optimization technique as described above.

When the MDT feature is enabled, a connected UE reports periodically (e.g., every ten seconds) the following information: GPS location shape (i.e., latitude, longitude, altitude, uncertainty semi-axes), RSRP and RSRQ of serving cell (primary cell in case of carrier aggregation (CA)), RSRP and RSRQ of 1st to 8th monitored LTE intra-frequency neighbor cells identified with PCI Layer 3, PUCCH and PUSCH SINR, Power Headroom, Timing Advance (TA, instantaneous or continual), Rank Indicator, Single/Dual code word Tx, Single/Dual code word Tx failures, downlink/uplink delays, downlink/uplink PDCP data volumes, number of Transmission Time Intervals (TTI) with buffered data, wideband CQI, uplink Modulation and Coding Scheme (MCS), and PDSCH and PUSCH PRB allocation.

This information, collected for a proper period (e.g., one to four weeks) and subject to suitable temporal and spatial averaging, can be used in different ways. The simplest method is to compute the overlap of the UE spatial distributions between two cells 401-402 as a rough estimation of the percentage of UEs of a cell 401-402 that can be steered to each of the other cells 401-402. In other words, the amount of MDT measurements of one cell 401-402 that are distributed within the area covered by another cell 401-402 gives an indication about the amount of users that can be steered to that cell 401-402. Another method includes correlating the spatial intensity of the UEs with the spatial statistics of the main radio measurements (e.g., with the RSRP).

Weight Adaptation

In step 712 of FIGS. 7A and 7B, optimization manager 514 determines or adapts recommended load distribution parameters 622 for the sector 202 based on the target number of users per cell 401-402. Load management sub-system 146 may use percentage weights assigned to the cells 401-402 to steer users, traffic, or load between the cells 401-402. Percentage weights are values that indicate a proportion of traffic that is steered to cells. Thus, the recommended load distribution parameters 622 for the sector 202 may comprise percentage weights that are used by one or more load management features 148. For example, percentage weights may be used for an idle mode load balancing feature to distribute the idle users among the cells 401-402, percentage weights may be used for an active mode load balancing feature to distribute active users among the cells, percentage weights may be used for inter-frequency load balancing to distribute idle or active users among the cells, etc.

The percentage weights are limited to a value range, such as a range of 0 . . . 100. Optimization manager 514 may adapt the percentage weights for cells 401-402 to present to load management sub-system 146, as part of the recommended load distribution parameters 622. In one embodiment, optimization manager 514 (see FIG. 7A) may perform percentage weight adaptation (optional step 730), which is a process that converges an actual traffic split in the sector 202 towards an optimized traffic split determined by optimization manager 514. The actual traffic split is measured in number of active users per cell 401-402, such as at the busy hour.

Linear Adaptation

Figure 16:
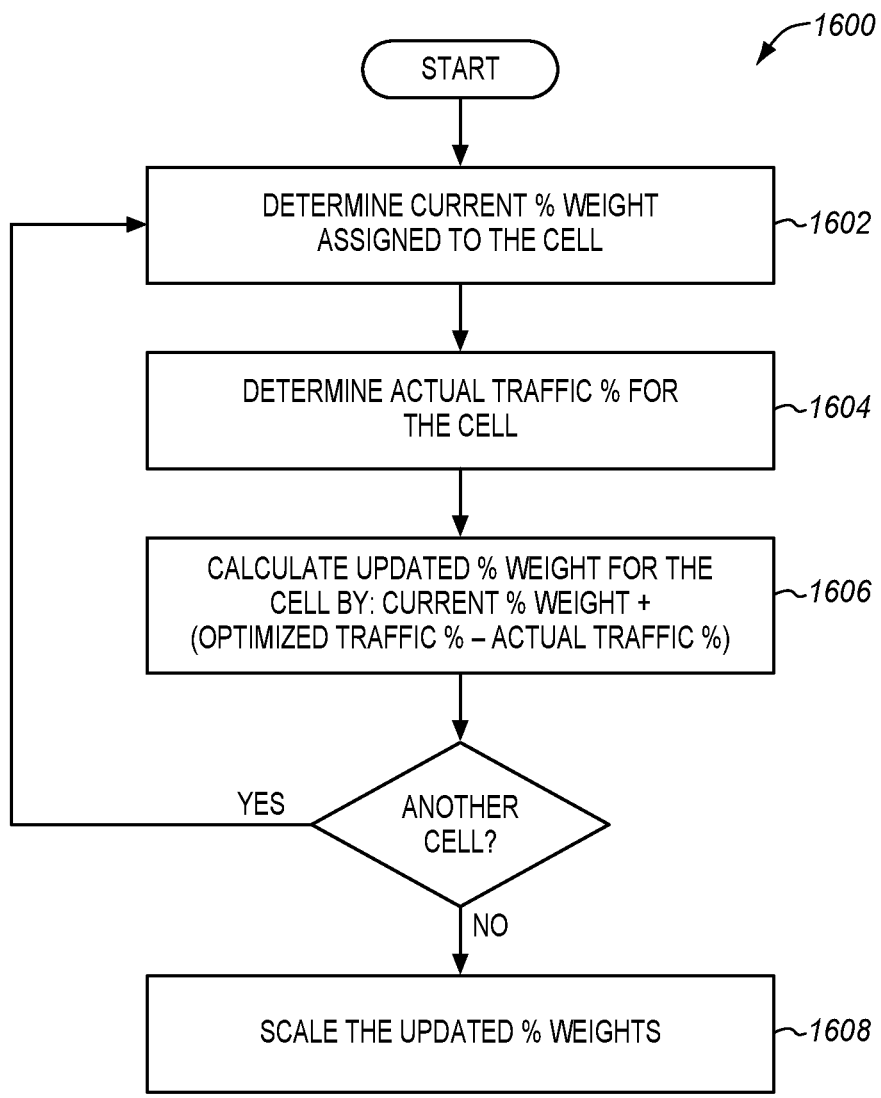
FIG. 16 is a flow chart illustrating a linear adaptation method in an illustrative embodiment.

One way of percentage weight adaptation is a linear adaptation. Through an iterative process of applying a linear function, an updated percentage weight of a load management feature 148 may be calculated, for each of the cells 401-402, as a relative traffic split between the actual traffic percentage, the current percentage weight setting of the load management feature 148, and the optimized percentage weight. FIG. 16 is a flow chart illustrating a linear adaptation method 1600 in an illustrative embodiment. For each cell 401-402 of the sector 202, optimization manager 514 determines the current percentage weight setting assigned to the cell 401 (step 1602). The current percentage weight setting is the value that is presently used for a load management feature 148 in relation to sector 202, such as from a prior optimization iteration of method 700. Optimization manager 514 also determines an actual traffic percentage for the cell 401 (step 1604) during the present optimization iteration. The actual traffic percentage represents the percentage of active users located in the sector 202 that are served by the cell 401. Optimization manager 514 then calculates an updated percentage weight for the cell 401 by adding the current percentage weight setting to a difference between an optimized traffic percentage and the actual traffic percentage for the cell 401 (step 1606). Assume for this example that the current percentage weight setting for the cell 401 is W[k−1], and the actual traffic percentage is N %[k]. It is further assumed that optimization manager 514 calculated the optimized traffic percentage (Nopt %) for the cell 401, based on the target number of users per cell 401-402. Optimization manager 514 may then calculate an updated or adapted percentage weight (W[k]) for the next optimization iteration according to:

$$W[k]=W[k-1]+(\text{Nopt \%}[k]-N\%[k])$$

Optimization manager 514 performs steps 1602-1606 to determine an updated percentage weight for each cell 401-402 overlapping the sector 202.

The sum of the updated percentage weights for the cells 401-402 are constrained or limited to a value range, such as 0 . . . 100. Thus, optimization manager 514 scales the updated percentage weights for the cells 401-402 to the value range to generate scaled percentage weights (step 1608). For example, the total updated percentage weights for the sector 202 may be expressed as:

$$W[k]\text{sector} = \sum_{i}^{n} W[k]_i$$

The scaled percentage weight for a cell 401-402 may therefore be expressed as:

$$W[k]i\text{scaled} = \frac{W[k]i * 100}{w[k]\text{sector}}$$

Thus, the updated percentage weights per cell 401-402 are scaled based on a sum of the updated percentage weights calculated for the sector 202.

Gradient Adaptation

Figure 17:
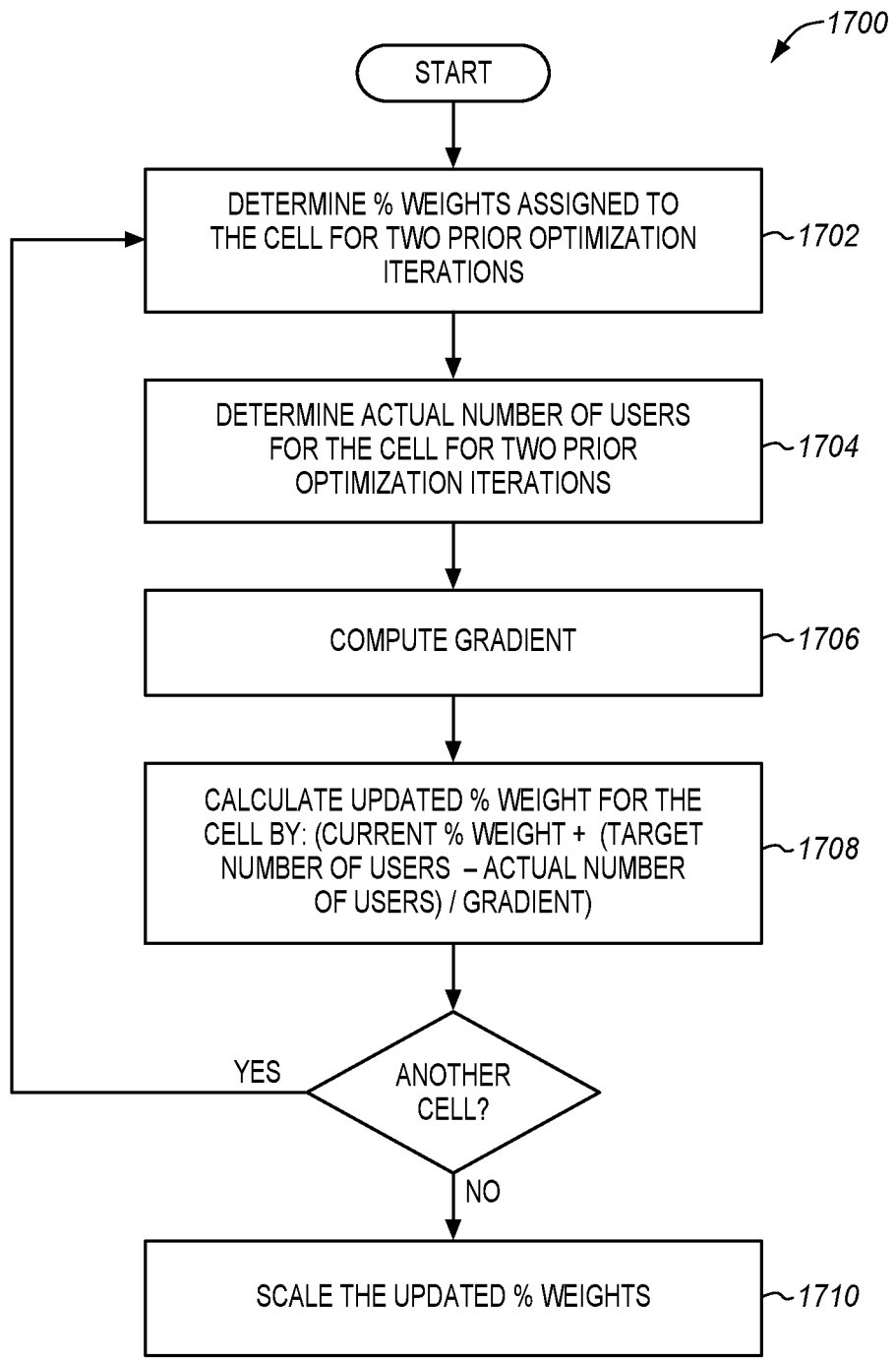
FIG. 17 is a flow chart illustrating a gradient adaptation method in an illustrative embodiment.

Another way of percentage weight adaptation is a gradient adaptation. The percentage weights generated by optimization (unbounded or bounded) are supposed to produce a proportional number of user steering in each cell 401-402. In case of unbounded optimization or also with bounded optimization, the actual number of users that can be moved among cells 401-402 may be different from the amount calculated by optimization manager 514. FIG. 17 is a flow chart illustrating a gradient adaptation method 1700 in an illustrative embodiment. For each cell 401-402 of the sector 202 (e.g., cell 401 for this example), optimization manager 514 determines the percentage weight settings assigned to the cell 401 (step 1702) for prior optimization iterations (e.g., W[k−1] and W[k−2]). Optimization manager 514 also determines the actual number of users served by the cell 401 (step 1704) for the prior optimization iterations (e.g., N[k−1] and N[k−2]). Optimization manager 514 computes a gradient of the variation of the number of users versus the variation of percentage weight settings for the cell 401 (step 1706). For example, the gradient may be calculated as follows:

Gradient=(N[k−1]−N[k−2])/(W[k−1]−W[k−2])

Optimization manager 514 then calculates an updated percentage weight for the cell 401 by dividing the difference between the target number of users and the actual number of users for the cell 401 by the gradient, and adding the result to the percentage weight setting for the prior optimization iteration (step 1708). Assume for this example that the percentage weight settings for the cell 401 are W[k−1] and W[k−2] for the prior optimization iterations, and the actual number of users are N[k−1] and N[k−2] for the prior optimization iterations. It is again assumed that optimization manager 514 calculated the target number of users (Nopt[k]) for the cell 401, such as in step 710 of FIGS. 7A and 7B. Optimization manager 514 may then calculate an updated percentage weight (W[k]) for the next optimization iteration according to:

W[k]=W[k−1]+(Nopt[k]−N[k])/Gradient

Optimization manager 514 performs steps 1702-1708 to determine an updated percentage weight for each cell 401-402 overlapping the sector 202. As before, the sum of the updated percentage weights for the cells 401-402 are constrained or limited to a value range, such as 0 . . . 100. Thus, optimization manager 514 scales the updated percentage weights for the cells 401-402 to the value range to generate scaled percentage weights (step 1710), as described above.

The effect of gradient adaptation is to magnify or reduce the percentage weights according to the deviation of the achieved user steering with respect to hypothetical linear behavior. The gradient may become very small if the traffic steering becomes ineffective and the capability of controlling the system goes to saturation. Thus, a lower bound may be set for the gradient to avoid a situation where W[k] becomes too high. Another situation that may arise is that the difference Nopt[k]−N[k] is not reducing since a certain amount of users cannot be moved to a cell 401-402 for some reason. When a continuous drive causes a percentage weight to saturate to "0" or "100", optimization manager 514 may apply low pass filtering to the difference Nopt[k]−N[k].

The gradient calculation above depended on multiple prior optimization iterations. When the first optimization iteration initiates (e.g., when the load management feature 148 is turned on), optimization manager 514 is not able to calculate a gradient as discussed above. Thus, optimization manager 514 may derive a percentage weight setting in proportion to SIB frequency layer priority settings. The priority settings specify the proportions in which users in idle mode will be steered to specific cells when transitioning to active mode.

For the second optimization iteration, a virtual gradient may be calculated to determine the updated percentage weight (W[k]) for the current iteration. The difference is that the first point of gradient calculus uses the point {N(i), W(i)} at the first optimization iteration, where W(i) is depending also on SIB priority settings.

For subsequent optimization iterations, optimization manager 514 may calculate an updated percentage weight (W[k]) for the current iteration according to the formula discussed above.

The computation of the gradient is meaningful when the number of active users is constant before and after optimization; that is from one optimization iteration to the following one. This is because the evaluation of user steering is done by adding or subtracting users to the sector 202 otherwise is not possible to evaluate the effect traffic steering. Thus, in order to calculate the gradient with homogeneous quantities:

N[k]·rescaled(k−1)=N[k]*(Sum N(k−1)/Sum N(k))

That is, the actual number of users per cell 401-402 of the current optimization iteration is rescaled according to the ratio between the total sector users at the previous optimization iteration and the total sector users at the current optimization iteration.

Machine Learning

In another embodiment, throughput optimizer 504 (see FIG. 5) may further include a Machine Learning (ML) system 522 that performs or assists in sector throughput optimization using machine learning techniques. ML system 522 may comprise circuitry, logic, hardware, means, etc., configured to use machine learning techniques to perform functions, such as to make predictions, recommendations, testing, or classifications for sectors of a RAN. ML system 522 operates based on one or more ML models 524 that are trained for ML system 522. Throughput optimizer 504 may further include an ML trainer 526, which comprises circuitry, logic, hardware, means, etc., configured to train the ML model(s) 524 for ML system 522. ML trainer 526 may use supervised, semi-supervised, and/or unsupervised algorithms to train the ML model(s) 524. Throughput optimizer 504 may further include a knowledge database 528, which comprises circuitry, logic, hardware, means, etc., configured to store data for training ML model(s) 524. Throughput optimizer 504 may further include a data handler 529, which comprises circuitry, logic, hardware, means, etc., configured to collect and/or pre-process data that is stored in knowledge database 528.

Figure 18:
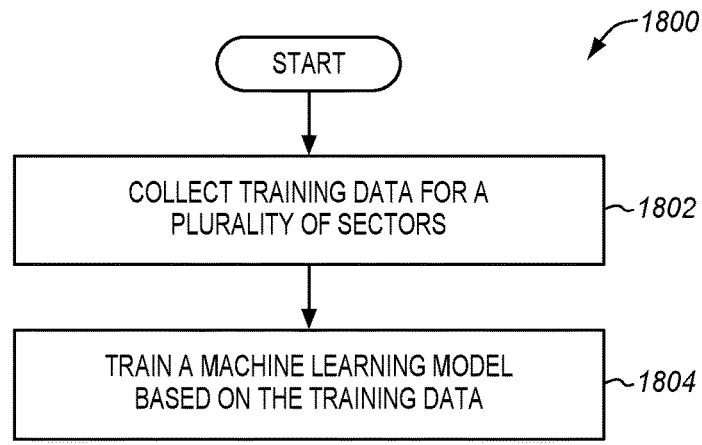
FIG. 18 is a flow chart illustrating a method of training a machine learning system in an illustrative embodiment.
Figure 19:
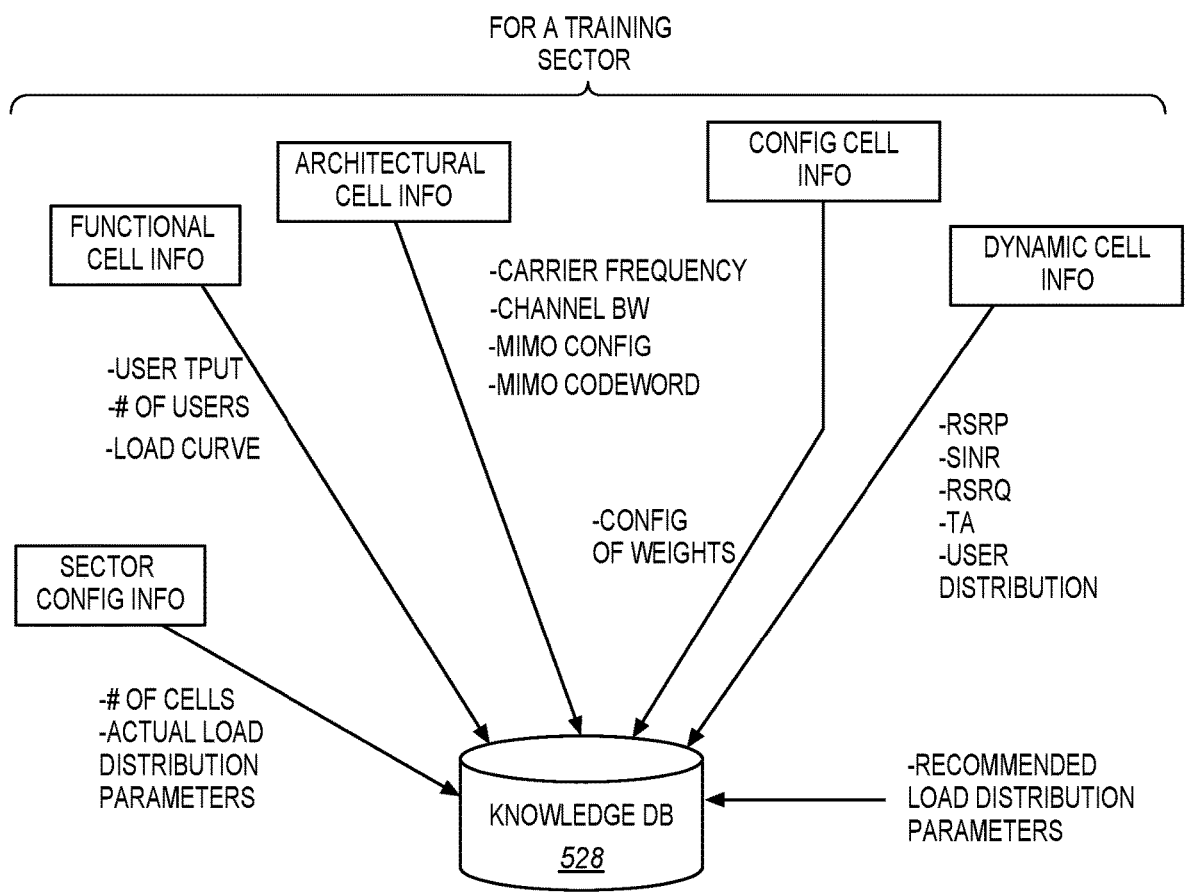
FIG. 19 is a schematic diagram illustrating collection of training data in an illustrative embodiment.

In machine learning as used by ML system 522, there is generally a training phase, a testing phase (or operating phase), and an inference phase. In the training phase, training datasets are used to build one or more ML models 524. FIG. 18 is a flow chart illustrating a method 1800 of training ML system 522 in an illustrative embodiment. In step 1802, training data is collected. For example, data handler 529 and/or systems may populate knowledge database 528 with data for sectors of the RAN 120 and/or other RANs. The sectors, which have data collected within knowledge database 528 for the purposes of training an ML model 524, are referred to herein as training sectors. FIG. 19 is a schematic diagram illustrating collection of training data in an illustrative embodiment. The training data may comprise any data related to a training sector of a RAN. ML system 522 may operate based on a principle of sector similarity. In turn, sector similarity may be based on cell similarity within the sector. Thus, the type of training data collected may contribute to determining cell similarity and sector similarity. For example, the training data may include sector configuration information for a training sector, such as the number of cells or frequency layers overlapping the training sector, actual load distribution parameters applied or set for the training sector, etc. The training data may include information specific to the cells that overlap the training sector. For example, the training data may include functional cell information indicating the performance of a cell. In other words, two cells may be similar if they have a similar relation between user throughput and number of active users. The functional cell information may include the user throughput of the cell, the number of users served by the cell, and/or a load curve indicating the relationship between user throughput and the number of active users in the cell. The training data may include architectural cell information indicating configuration management (CM) characteristics of a cell that contribute to the relationship between user throughput and the number of active users in the cell. The architectural cell information may include carrier frequency, channel bandwidth (BW), MIMO configuration, MIMO codeword, etc. The training data may include configuration cell information, such as configuration of percentage weights and/or other data. The training data may include dynamic cell information, such as RF contributors in terms of coverage (e.g., RSRP), UL interference (e.g., SINR), and UL signal quality (e.g., RSRQ), spatial distribution of users in the cell (e.g., TA), actual user distribution with a cell, etc. The training data may further include recommended load distribution parameters 622 (e.g., recommended percentage weights) for the training sector, such as provided by optimization manager 514. The type of training data illustrated in FIG. 19 is provided as an example, and additional or alternative training data may be collected as desired.

It is noted that training data may be collected for multiple training sectors of RAN 120 or other RANs as shown in FIG. 19. The training data may be collected during actual operation of RAN 120 (or other RANs), during a test period where at least a portion of RAN 120 (or other RANs) is isolated, or a combination of the two. The training data may be collected during iterative sector optimization of training sectors as discussed above (e.g., for each optimization iteration that is performed for iterative sector optimization on a sector). The training data may be collected from other sources, such as from experts.

In FIG. 18, ML trainer 526 uses the training data to build one or more ML models 524 for ML system 522 (step 1804) with training algorithms. The training data may be segmented into a set of sector samples, and each sector sample has input data (i.e., one or more inputs) and a desired output. For example, the input data for a sector sample may include information on the cells that overlap the training sector, and the output may be a label or classification for the training sector. Each sector sample is represented by a feature vector. From the feature vectors, a training algorithm learns a mathematical function that can be used to predict an output associated with new inputs (i.e., determine output for a new sector that was not a part of the training data). A label or classification may also be assigned to the feature vectors.

Some of the training data may be collected over an observation period, such as one week. For example, when the training data is collected during iterative sector optimization, there may be multiple values collected over time for the same type of data. When this occurs, data handler 529 may sample the multiple values, and calculate a representative value for the observation period to remove noise. One example is when raw KPI values for KPIs are collected from performance management sub-system 142 for a training sector. In one embodiment, the KPIs may include the following: sector aggregated user throughput, sector aggregated capacity, sector busy hour aggregated capacity, handover performance band, DL channel quality band, UL link quality band, DL signal quality band, user distance distribution band, cell DL coverage band, layer user distribution band, load curve band, and geo-localization. However, raw KPI values may be collected for other KPIs as desired. During an optimization iteration (e.g., one week) performed on the sector, raw KPI values may be collected at multiple collection times (e.g., hourly). The raw KPI values may be pre-processed to determine a representative KPI value for the KPI that is stored in knowledge database 528.

Figure 20:
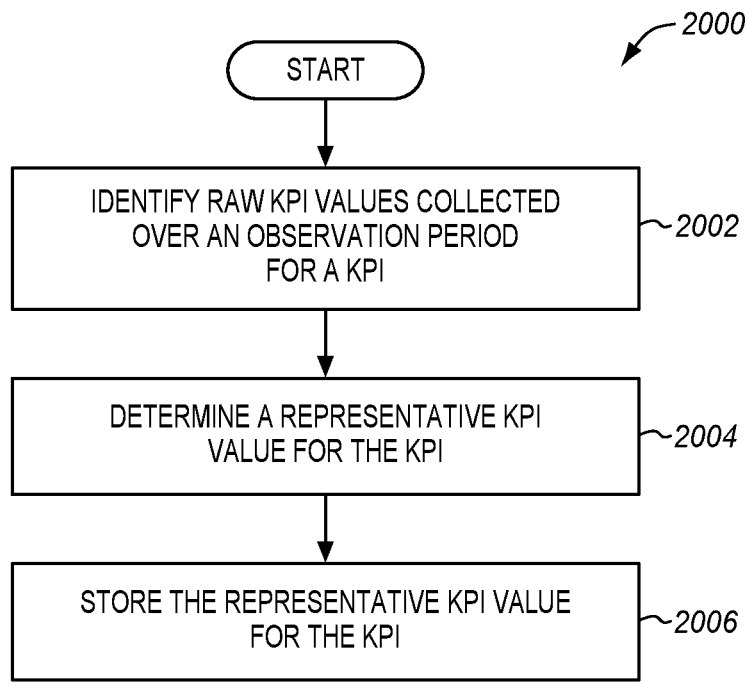
FIG. 20 is a flow chart illustrating a method of pre-processing raw KPI values in an illustrative embodiment.

FIG. 20 is a flow chart illustrating a method 2000 of pre-processing raw KPI values in an illustrative embodiment. Data handler 529 identifies a plurality of raw KPI values collected over an observation period (step 2002) for a particular KPI. For example, data handler 529 may collect raw KPI values measured at collection times (e.g., hourly) over an observation period of one week (e.g., equal to an optimization iteration). Data handler 529 determines a representative KPI value (or collection of representative KPI values) for the KPI over the observation period based on the raw KPI values (step 2004). For example, data handler 529 may determine a mean, median, or mode of the raw KPI values over the observation period to determine the representative KPI value. Data handler 529 then stores the representative KPI value for the KPI as training data in knowledge database 528 (step 2006).

Figure 21:
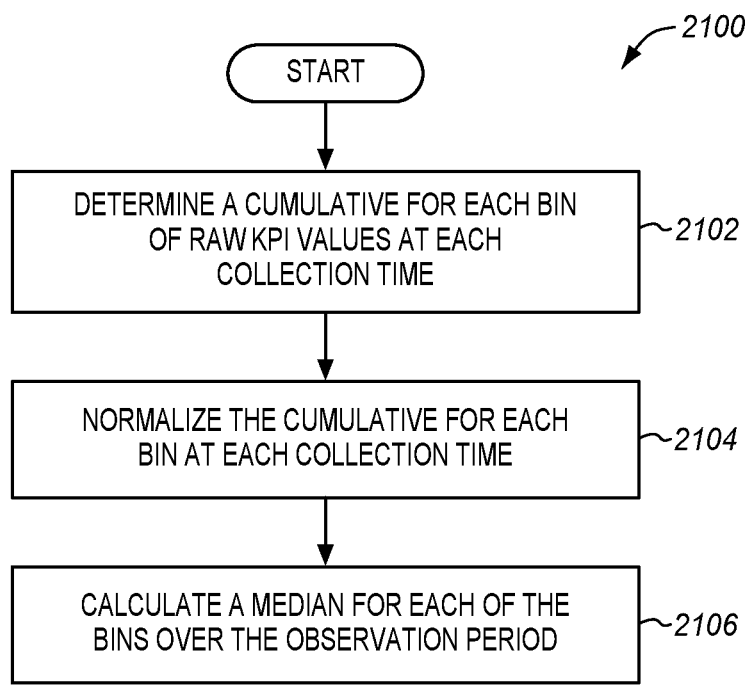
FIG. 21 is a flow chart illustrating a method of pre-processing raw KPI values that are arranged in bins in an illustrative embodiment.

There may be scenarios where the raw KPI values are arranged into bins for the KPI, where a bin is an interval of data values. As an example, for the cell DL coverage band KPI, the raw KPI values may comprise RSRP measurements in decibel-milliwatts (dBm) over a reporting range of "−140 dBm" to "−44 dBm". These raw KPI values may be arranged into bins in intervals of 4 dBm, or other desired intervals. FIG. 21 is a flow chart illustrating a method 2100 of pre-processing raw KPI values that are arranged in bins in an illustrative embodiment. Data handler 529 determines a cumulative for each bin of raw KPI values at each of the collection times (e.g., each hour) over the observation period (step 2102). Data handler 529 normalizes the cumulative for each of the bins at each of the collection times (step 2104). Data handler 529 then calculates a median for each of the bins over the observation period to determine a representative KPI value for the KPI (step 2106). The median for each of the bins is a distribution for the KPI, and this distribution indicates a characteristic of a cell that is stored in knowledge database 528.

After the data collection and training phase, ML system 522 may be used to output a prediction or recommendation based on input data for a new sector. ML system 522 may also produce a score or probability (e.g., output of a loss function in an ML model 524) that reflects the confidence in the prediction or recommendation.

Positive Yield Prediction

In one embodiment, machine learning may be used to predict whether recommended load distribution parameters 622 from sector throughput optimization will result in an improvement in aggregated user throughput for a "new" sector of a RAN 120, which is referred to as positive yield prediction. As an example, there may be actual load distribution parameters assigned for a sector to distribute users between the cells overlapping the sector. ML system 522 is able to determine whether recommended load distribution parameters 622 for the sector would provide a positive yield if applied in that sector, based on how the recommended load distribution parameters 622 performed for "similar" training sectors.

Figure 22:
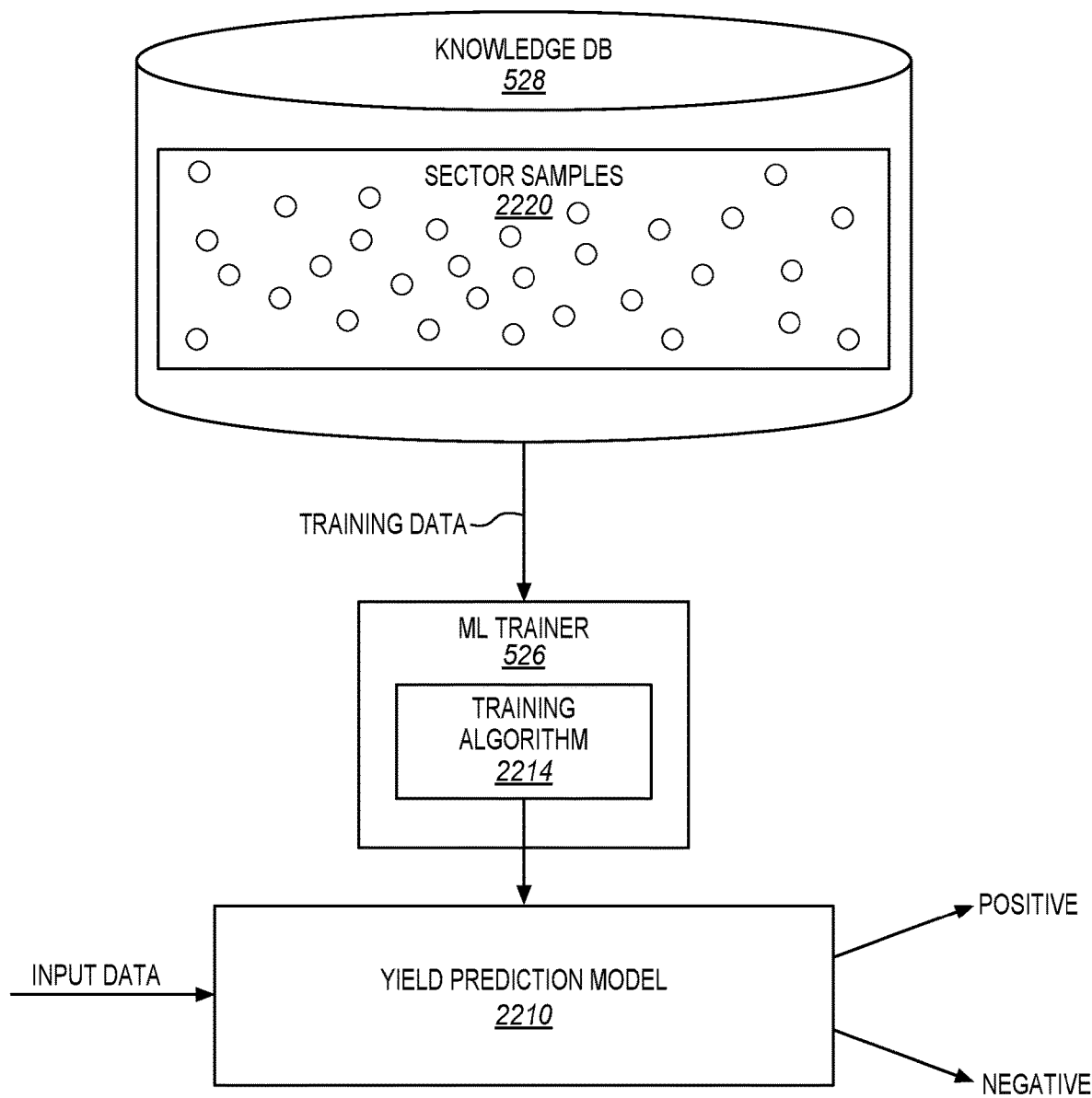
FIG. 22 is a schematic diagram illustrating training of a yield prediction model in an illustrative embodiment.

To provide positive yield prediction, a yield prediction model may be built for ML system 522 based on the training data. FIG. 22 is a schematic diagram illustrating training of a yield prediction model 2210 in an illustrative embodiment. Yield prediction model 2210 may be an example of a binary classification model (e.g., decision tree) that is able to output one of two possible classifications based on input data. ML trainer 526 receives training data from knowledge database 528 for a plurality of training sectors, and uses training algorithm 2214 to build the yield prediction model 2210. The training data may be segmented into sector samples 2220 that correspond with the training sectors used for training. Each sector sample 2220 has input data (i.e., one or more inputs) based on the training data. For example, the inputs for a sector sample 2220 may include sector configuration information, cell characteristics of the cells that overlap the training sector, actual load distribution parameters, recommended load distribution parameters 622, etc. Each sector sample 2220 also has a desired output. For example, the output for a sector sample 2220 is a positive yield classification indicating whether a positive yield or negative yield in aggregated user throughput is or would be realized with sector throughput optimization. The positive yield classification may be a Boolean value, such as "POSITIVE" or "NEGATIVE", "Y" or "N", "TRUE" or "FALSE", "0" or "1", etc. Thus, if input data for a new sector is input to the yield prediction model 2210, it is able to output a positive yield classification (e.g., "POSITIVE" or "NEGATIVE"), and a probability of the positive yield classification.

In defining the sector samples 2220, a feedback loop may be used to determine how load distribution parameters affect aggregated user throughput. For example, assume that actual load distribution parameters are initially applied in a training sector. A system, such as load management optimization system 150, may determine the aggregated user throughput of the training sector when the actual load distribution parameters are applied. Assume next that recommended load distribution parameters 622 are applied in the training sector. The system may determine the aggregated user throughput of the training sector when the recommended load distribution parameters 622 are applied, and whether or not the recommended load distribution parameters 622 resulted in a positive yield in aggregated user throughput. Thus, the system may determine how aggregated user throughput changes when the recommended load distribution parameters 622 are applied, and associate a positive or negative yield with the recommended load distribution parameters 622. This data may be stored in knowledge database 528 as part of the feedback loop, and used to define the sector samples 2220.

Figure 23:
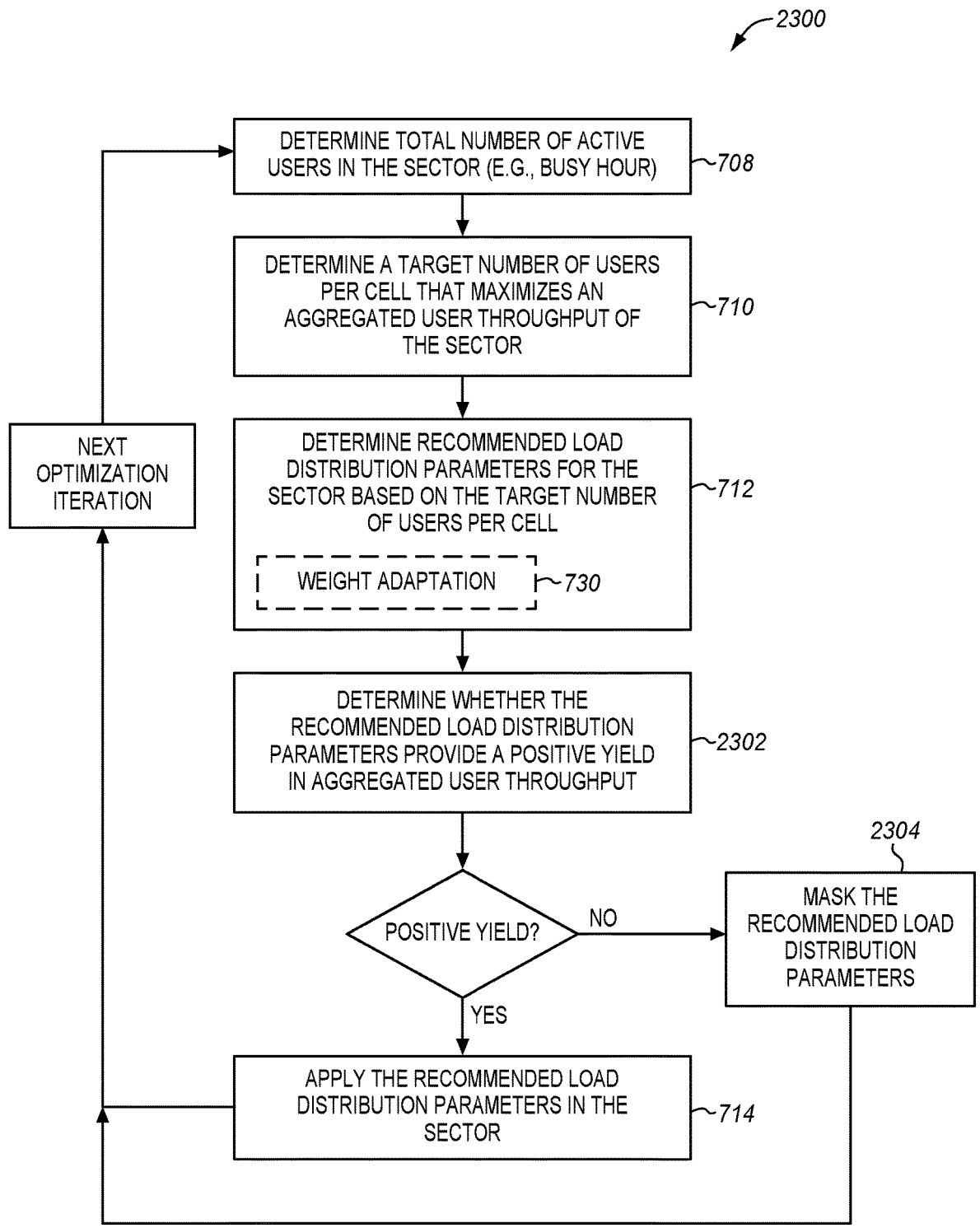
FIG. 23 is a flow chart illustrating a method of using positive yield prediction with iterative sector optimization in an illustrative embodiment.

In one embodiment, a positive yield prediction may be used in conjunction with iterative sector optimization as described in FIGS. 7A and 7B. FIG. 23 is a flow chart illustrating a method 2300 of using positive yield prediction with iterative sector optimization in an illustrative embodiment. For the sake of brevity, steps 708, 710, 712, and 714 are shown in FIG. 23. As a reminder of these steps, for the current optimization iteration, optimization manager 514 determines the total number of active users in the sector 202 (step 708), and determines a target number of users per cell 401-402 that maximizes the aggregated user throughput of the sector 202 (step 710). Optimization manager 514 then adapts, modifies, or determines recommended load distribution parameters 622 for the sector 202 based on the target number of users per cell 401-402 (step 712).

As discussed above, RF considerations and other factors may not allow users to move between the cells 401-402 of the sector 202 from the current optimization iteration to the next optimization iteration based on the recommended load distribution parameters 622. For these and other reasons, the recommended load distribution parameters 622 may not result in an improvement (i.e., positive yield) in aggregated user throughput for the sector 202. In this embodiment, before applying the recommended load distribution parameters 622 in the sector 202, ML system 522 determines whether the recommended load distribution parameters 622 provide a positive yield in aggregated user throughput based the yield prediction model 2210 (step 2302). For the determination, ML system 522 receives input data for the sector 202 for the current optimization iteration. The input data in this example includes actual load distribution parameters for the sector 202 (e.g., as determined in the prior optimization iteration), and the recommended load distribution parameters 622 for the sector 202 as determined for the current optimization iteration. The input data also includes other characteristics of the sector 202 and the cells 401-402 overlapping the sector 202. ML system 522 processes the input data to predict whether the recommended load distribution parameters 622 would result in an improvement in aggregated user throughput of the sector 202 based on the yield prediction model 2210. ML system 522 then outputs a positive yield classification for the sector 202.

When the positive yield classification indicates a positive yield in aggregated user throughput, optimization manager 514 applies the recommended load distribution parameters 622 for the current optimization iteration in sector 202 (step 714). When the positive yield classification does not indicate a positive yield in aggregated user throughput, optimization manager 514 masks the recommended load distribution parameters 622 (step 2304) for the current optimization iteration, and maintains the load distribution parameters from a prior optimization iteration. Optimization manager 514 may implement a variety of policies about masking.

Direct Sector Optimization

In another embodiment, machine learning may be used to recommend load distribution parameters that maximize the aggregated user throughput of a "new" sector of a RAN 120 (or another RAN), which is referred to as direct sector optimization. A carrier may implement direct sector optimization as an alternative to iterative sector optimization as disclosed above. With direct sector optimization, ML system 522 is able to determine recommended load distribution parameters 622 for a new sector based on the recommended load distribution parameters assigned to "similar" training sectors.

Figure 24:
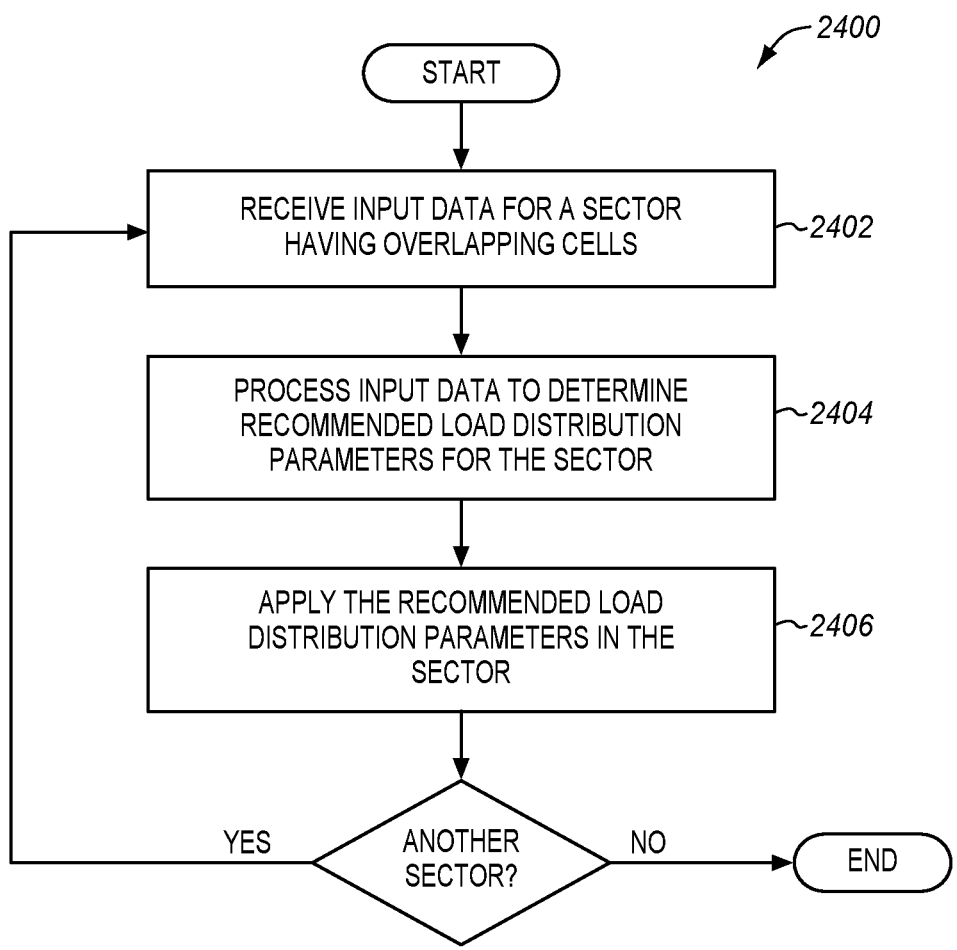
FIG. 24 is a flow chart illustrating a method of performing direct sector optimization in an illustrative embodiment.

FIG. 24 is a flow chart illustrating a method 2400 of performing direct sector optimization in an illustrative embodiment. The steps of method 2400 will be described with reference to load management optimization system 150 in FIG. 5, but those skilled in the art will appreciate that method 2400 may be performed in other systems.

Direct sector optimization is performed on a new sector 202 of a RAN 120 (also referred to as a target sector) having a plurality of overlapping cells 401-402, such as a sector identified in step 602 in FIG. 6A. ML system 522 receives input data for the sector (step 2402). In this embodiment, it is assumed that cells 401-402 overlap at the sector 202 for the sake of clarity of this description, but more than two cells may overlap as shown in FIGS. 4A and 4B.

ML system 522 processes the input data to determine recommended load distribution parameters 622 for the sector 202 based on a machine learning model 524 (step 2404). As described above, the machine learning model 524 is trained with sector samples of training sectors, and the inputs of the sector samples provide fingerprints for their corresponding training sectors. ML system 522 is able to identify one or more sector samples that are "similar" to the sector 202 based on the input data for the sector 202, and determine the recommended load distribution parameters 622 from the similar training sectors. Optimization manager 514 may then apply the recommended load distribution parameters 622 in sector 202 of RAN 120 (step 2406). In one embodiment, optimization manager 514 may provide, send, or transmit (e.g., automatically) the recommended load distribution parameters 622 to RAN 120, such as through network interface component 502, so that users are distributed among the cells 401-402 based on the recommended load distribution parameters 622. For example, optimization manager 514 may automatically transmit control signals to RAN 120 with the recommended load distribution parameters 622. In another embodiment, optimization manager 514 may send the recommended load distribution parameters 622 to network management system 140, and/or another system, which operates to apply the recommended load distribution parameters 622 in RAN 120. For example, optimization manager 514 may automatically transmit control signals to network management system 140 with the recommended load distribution parameters 622.

Method 2400 may be repeated for multiple "new" sectors 202 in RAN 120. One technical benefit of direct sector optimization is that recommended load distribution parameters 622 can be quickly identified for new sectors 202 without having to perform iterative sector optimization over a period of time (e.g., three months) on these new sectors 202.

Figure 25:
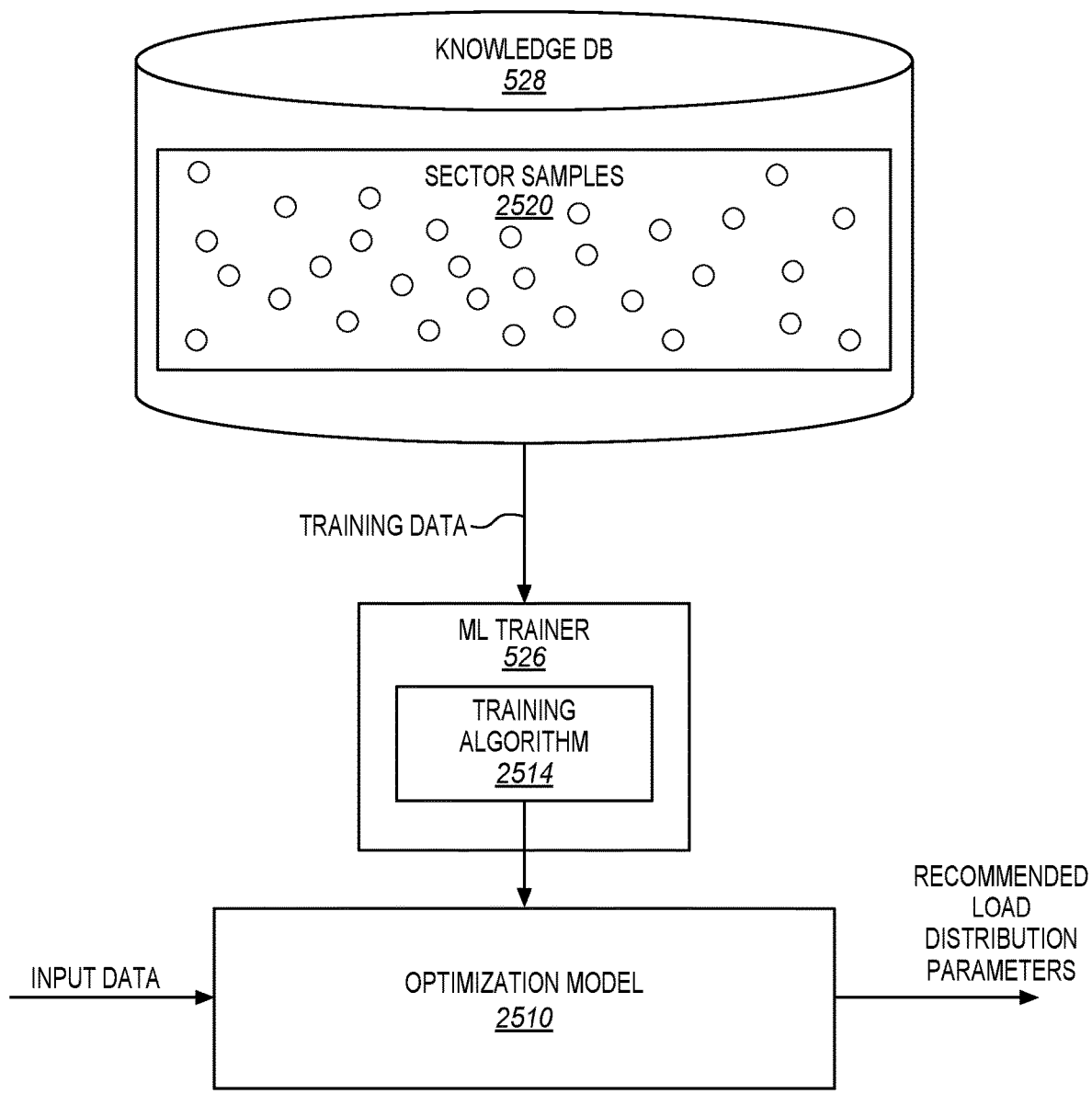
FIG. 25 is a schematic diagram illustrating training of an optimization model in an illustrative embodiment.

To provide direct sector optimization in one embodiment, an optimization model may be built for ML system 522 based on the training data. FIG. 25 is a schematic diagram illustrating training of an optimization model 2510 in an illustrative embodiment. Optimization model 2510 may be an example of a regression model that is able to output values based on input data. Optimization model 2510 may alternatively comprise a multiclass classification model or another type of model in other embodiments. ML trainer 526 receives training data from knowledge database 528 for a plurality of training sectors, and uses training algorithm 2514 to build optimization model 2510. As above, the training data is segmented into sector samples 2520 that correspond with the training sectors used for training. Each sector sample 2520 has input data (i.e., one or more inputs) based on the training data. For example, the inputs for a sector sample 2520 may include sector configuration information, cell characteristics of the cells that overlap the training sector, etc. Each sector sample 2520 also has a desired output. For example, the output for a sector sample 2520 may be recommended load distribution parameters 622 for the training sector. The recommended load distribution parameters 622 may be assigned to a training sector by iterative optimization unit 510 (i.e., iterative sector optimization may have been performed on the training sector), or by another system that implements another optimization strategy that maximizes or augments the aggregated user throughput of a training sector.

Figure 26:
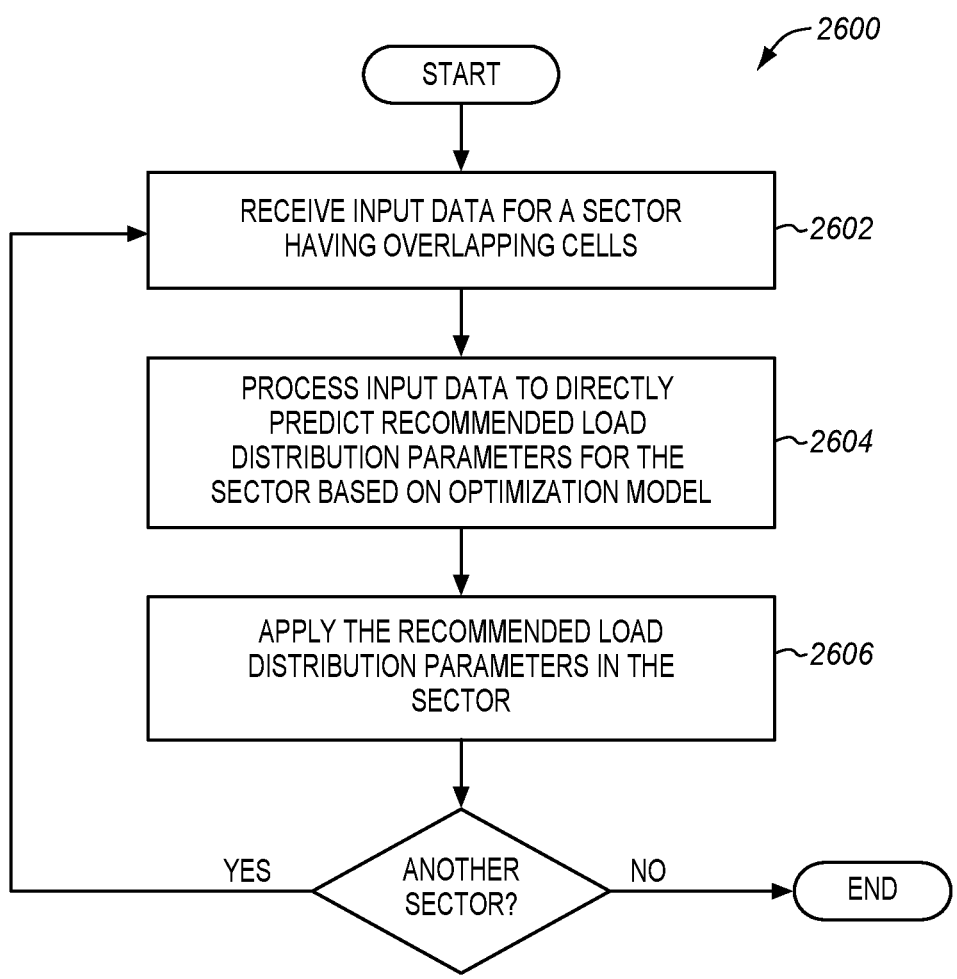
FIG. 26 is a flow chart illustrating a method of performing direct sector optimization with an optimization model in an illustrative embodiment.

FIG. 26 is a flow chart illustrating a method 2600 of performing direct sector optimization with optimization model 2510 in an illustrative embodiment. The steps of method 2600 will be described with reference to load management optimization system 150 in FIG. 5, but those skilled in the art will appreciate that method 2600 may be performed in other systems.

ML system 522 receives input data for the sector 202 (step 2602). ML system 522 processes the input data to predict recommended load distribution parameters 622 for the sector 202 based on optimization model 2510 (step 2604). As described above, optimization model 2510 is trained with sector samples 2520, and the inputs of the sector samples 2520 provide fingerprints for their corresponding training sectors. Thus, ML system 522 is able to identify one or more sector samples 2520 that are "similar" to the sector 202 based on the input data for the sector 202. For example, two sectors may be considered similar if they have the same number of cells, the cells belong to the same frequency layers, the cells have the same or similar performance models (e.g., load curves), and/or the cells have other similar characteristics. Thus, the input data may include any number of variables that are input to the optimization model 2510. For example, the variables may include the number of cells or frequency layers overlapping the sector 202, actual load distribution parameters set for the sector 202, and cell-specific information for the cells 401-402 overlapping the sector 202, such as user throughput versus number of active users, carrier frequency, channel bandwidth, MIMO configuration, MIMO codeword, coverage (e.g., RSRP), UL interference (e.g., SINR), UL signal quality (e.g., RSRQ), spatial distribution of users in the cell (e.g., TA), actual user distribution with a cell, etc. From the input data, the optimization model 2510 is able to directly predict the recommended load distribution parameters 622 for sector 202. Throughput optimizer 504 may then apply the recommended load distribution parameters 622 in sector 202 of RAN 120 (step 2606).

Method 2600 may be repeated for multiple "new" sectors 202 in RAN 120.

In the above embodiment, the optimization model 2510 is used to directly predict the recommended load distribution parameters 622 based on the input data. In that embodiment, the optimization model 2510 was trained to output recommended load distribution parameters 622 (e.g., a regression model). In another embodiment, the yield prediction model 2210 may be used to determine recommended load distribution parameters 622 for a new sector.

Figure 27:
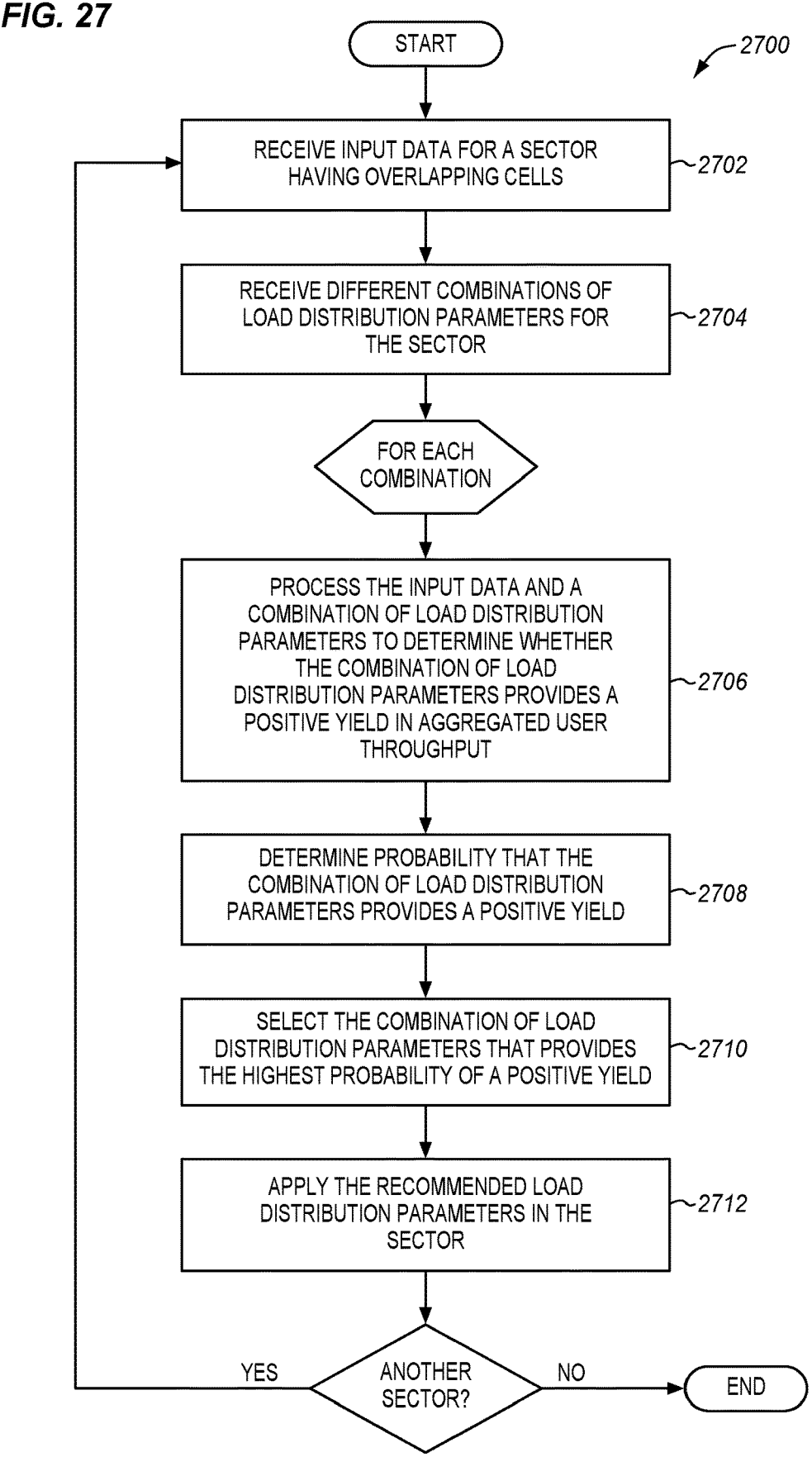
FIG. 27 is a flow chart illustrating a method of performing direct sector optimization with a yield prediction model in an illustrative embodiment.

FIG. 27 is a flow chart illustrating a method 2700 of performing direct sector optimization with a yield prediction model 2210 in an illustrative embodiment. The steps of method 2700 will be described with reference to load management optimization system 150 in FIG. 5, but those skilled in the art will appreciate that method 2700 may be performed in other systems.

As an overview of method 2700, yield prediction model 2210 is trained to output a positive yield classification for a sector indicating whether or not recommended load distribution parameters 622 (e.g., from iterative optimization unit 510) would yield a positive result. Thus, yield prediction model 2210 does not directly predict recommended load distribution parameters 622 as with optimization model 2510. However, if different combinations of load distribution parameters (e.g., percentage weights) are provided as input to yield prediction model 2210, then yield prediction model 2210 can output a positive yield classification for each combination along with a probability of the positive yield classification. The combination of load distribution parameters with the highest probability of a positive yield may be considered the recommended load distribution parameters 622 for a sector.

Figure 28:
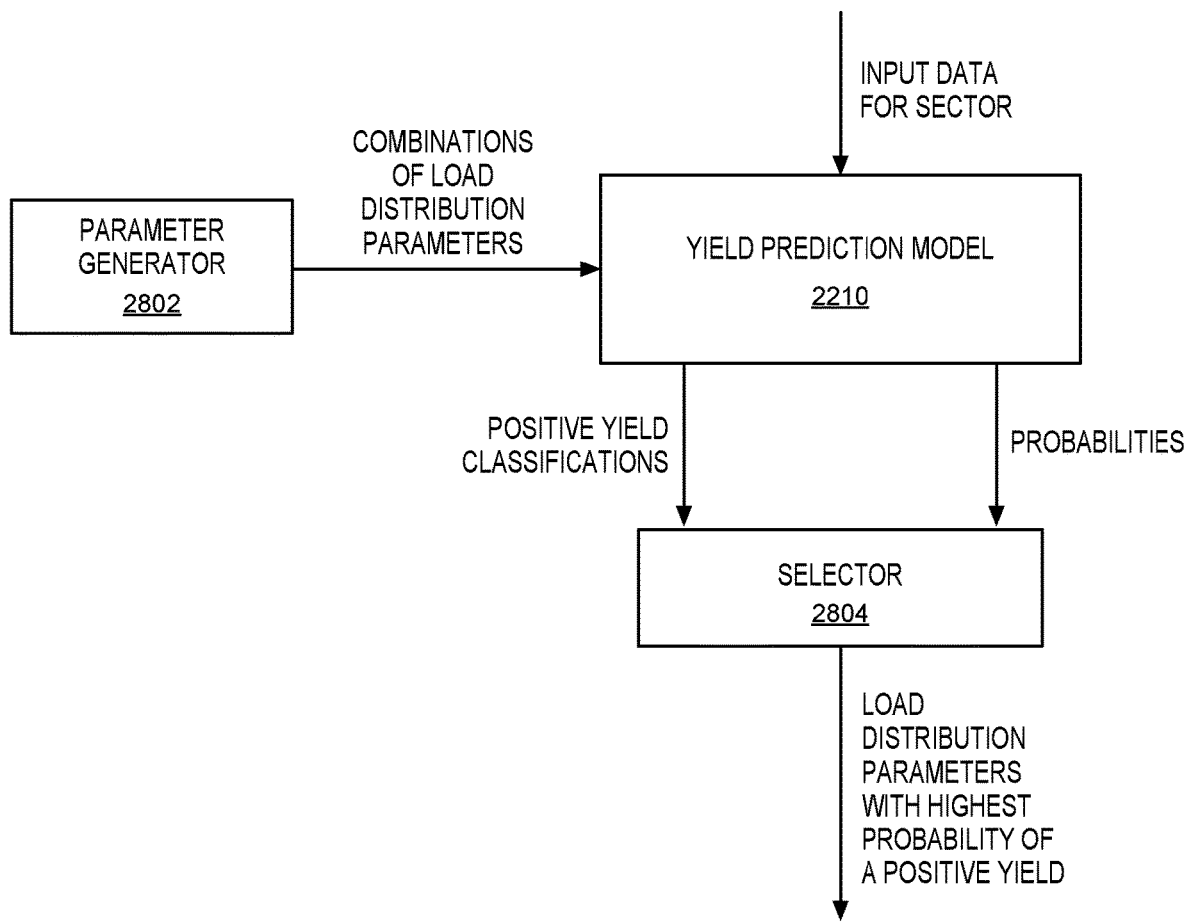
FIG. 28 is a schematic diagram illustrating direct sector optimization with a yield prediction model in an illustrative embodiment.

Thus, ML system 522 receives input data for the sector (step 2702). Again, it is assumed that cells 401-402 overlap at the sector 202 for the sake of clarity of this description, but more than two cells may overlap as shown in FIGS. 4A and 4B. ML system 522 also receives different combinations of load distribution parameters for the sector (step 2704). FIG. 28 is a schematic diagram illustrating direct sector optimization with a yield prediction model 2210 in an illustrative embodiment. Throughput optimizer 504 may further include a parameter generator 2802 that is configured to generate the different combinations of load distribution parameters. For example, parameter generator 2802 may generate different combination of percentage weights for cells 401-402 as is used by a load management feature 148. Parameter generator 2802 may select the combinations of load distribution parameters from a random distribution of load distribution parameters, from a user-defined distribution of load distribution parameters, etc.

In FIG. 27, for each of the different combinations, ML system 522 processes the input data and a combination of load distribution parameters to determine whether the combination of load distribution parameters provides a positive yield in aggregated user throughput for the sector based on the yield prediction model 2210 (step 2706). ML system 522 also determines the probability that the combination of load distribution parameters provides a positive yield in aggregated user throughput based the yield prediction model 2210 (step 2708). The probability reflects the confidence that the combination of load distribution parameters provides a positive yield. As shown in FIG. 28, yield prediction model 2210 generates a positive yield classification and a probability for each combination of load distribution parameters.

In FIG. 27, throughput optimizer 504 selects the combination of load distribution parameters that provides the highest probability of a positive yield in aggregated user throughput as the recommended load distribution parameters 622 (step 2710). As shown in FIG. 28, throughput optimizer 504 may include a selector 2804 that receives the positive yield classification and probability from yield prediction model 2210 for each combination of load distribution parameters. Selector 2804 may therefore select the combination of load distribution parameters that provides the highest probability as the recommended load distribution parameters 622. In FIG. 27, throughput optimizer 504 may then apply the recommended load distribution parameters 622 in sector 202 of RAN 120 (step 2712).

Method 2700 provides a technical benefit in that the yield prediction model 2210 may be "reused" to predict recommended load distribution parameters 622 for a new sector 202. Even though the yield prediction model 2210 may be built for iterative sector optimization, ML system 522 may re-purpose the yield prediction model 2210 for direct sector optimization so that a separate ML model does not have to be trained.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:
  (a) hardware-only circuit implementations (such as implementations in only analog and/or digital circuitry);
  (b) combinations of hardware circuits and software, such as (as applicable):
    (i) a combination of analog and/or digital hardware circuit(s) with software/firmware; and
    (ii) any portions of hardware processor(s) with software (including digital signal processor(s)), software, and memory(ies) that work together to cause an apparatus, such as a mobile phone or server, to perform various functions); and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. A system that provides load management for a Radio Access Network (RAN), the system comprising:
at least one processor and memory; the at least one processor causes the system to identify a plurality of cells overlapping at a sector of the RAN; the at least one processor causes the system to perform sector throughput optimization over multiple optimization iterations of:
determining a total number of active users in the overlapping cells in the sector;
identifying load curves for the overlapping cells, wherein each of the load curves indicates a relationship between user throughput and a number of active users for a respective cell of the overlapping cells, and wherein a load curve for each cell of the overlapping cells is generated by:
(a) determining user throughput for the cell during an aggregation period;
(b) determining a number of active users in the cell during the aggregation period;
(c) adding a sample on a user throughput plot based on the user throughput and the number of active users determined in the cell during the aggregation period;
(d) repeating (a)-(c) over a collection period that is longer than the aggregation period to obtain a plurality of samples on the user throughput plot; and
(e) generating, after the collection period, the load curve for the cell based on the user throughput plot;
determining, based on the load curves, a target number of users per cell of the overlapping cells that maximizes an aggregated user throughput of the overlapping cells of the sector, wherein a sum of the target number of users per cell of the overlapping cells is equal to the total number of active users in the overlapping cells in the sector, wherein determining the target number of users per cell includes using the load curves to determine a base line aggregated user throughput of a base line number of users per cell of the overlapping cells and a recommended aggregated user throughput of the target number of users per cell of the overlapping cells of the sector, and wherein the target number of users per cell of the overlapping cells maximizes the aggregated user throughput in response to a gain threshold between the base line aggregated user throughput and the recommended aggregated user throughput exceeding a predefined gain threshold;
determining recommended load distribution parameters for the sector based on the target number of users per cell of the overlapping cells that maximizes the aggregated user throughput of the overlapping cells of the sector; and
applying the recommended load distribution parameters in the sector to distribute users among the cells of the overlapping cells.

2. The system of claim 1 wherein the at least one processor causes the system to:
determine a busy hour for the sector; and
determine the target number of users per cell that maximizes the aggregated user throughput of the sector during the busy hour.

3. The system of claim 1 wherein the at least one processor causes the system to determine the target number of users per cell that maximizes the aggregated user throughput of the sector by:
identifying permutations of the target number of users per cell where the sum of the target number of users per cell for each of permutations equals the total number of active users in the sector;
calculating the aggregated user throughput for the sector regarding each of the permutations; and
identifying a recommended permutation that provides a maximum aggregated user throughput for the sector, wherein the recommended permutation indicates the target number of users per cell that maximizes the aggregated user throughput of the sector.

4. The system of claim 1 wherein the at least one processor causes the system to determine the target number of users per cell that maximizes the aggregated user throughput of the sector by:
determining an upper bound and a lower bound for the target number of users per cell;
identifying permutations of the target number of users per cell where the sum of the target number of users per cell equals the total number of active users in the sector, and the target number of users per cell is within the upper bound and the lower bound;
calculating the aggregated user throughput for the sector regarding each of the permutations; and
identifying a recommended permutation that provides a maximum aggregated user throughput for the sector, wherein the recommended permutation indicates the target number of users per cell that maximizes the aggregated user throughput of the sector.

5. The system of claim 1 wherein:
the recommended load distribution parameters include percentage weights assigned to the cells to distribute the users among the cells, and the percentage weights are limited to a value range; and
the at least one processor, for each cell of the cells, causes the system to:
determine a current percentage weight setting assigned to the cell;
determine an actual traffic percentage for the cell; and
calculate an updated percentage weight for the cell by adding the current percentage weight setting to a difference between the actual traffic percentage and an optimized traffic percentage, wherein the optimized traffic percentage is based on the target number of users per cell; and
the at least one processor causes the system to scale the updated percentage weight for each of the cells to the value range.

6. The system of claim 1 wherein:
the recommended load distribution parameters include percentage weights assigned to the cells to distribute the users among the cells, and the percentage weights are limited to a value range; and
the at least one processor, for each cell of the cells, causes the system to:
determine percentage weight settings assigned to the cell for two prior optimization iterations;
determine an actual number of users served by the cell for the two prior optimization iterations;
compute a gradient of a variation of the actual number of users versus a variation of the percentage weight settings for the cell for the two prior optimization iterations; and calculate an updated percentage weight for the cell by dividing a difference between the target number of users and the actual number of users for the cell by the gradient, and adding a result of the division to the percentage weight setting for the prior optimization iteration; and the at least one processor causes the system to scale the updated percentage weight for each of the cells to the value range.

7. The system of claim 1 wherein:

the at least one processor causes the system to:
  determine, at a machine learning system, whether the recommended load distribution parameters for a current optimization iteration provides a positive yield in the aggregated user throughput of the sector based on a yield prediction model; and the at least one processor causes the system to:
  apply the recommended load distribution parameters in the sector when the recommended load distribution parameters for the current optimization iteration provides a positive yield in the aggregated user throughput of the sector; and
  mask the recommended load distribution parameters for the current optimization iteration when the recommended load distribution parameters for the current optimization iteration do not provide a positive yield in the aggregated user throughput of the sector.

8. A method of load management in a Radio Access Network (RAN), the method comprising:

identifying a plurality of cells overlapping at a sector of the RAN; and performing sector throughput optimization over multiple optimization iterations of:

determining a total number of active users in the overlapping cells in the sector;

identifying load curves for the overlapping cells, wherein each of the load curves indicates a relationship between user throughput and a number of active users for a respective cell of the overlapping cells, and wherein a load curve for each cell of the overlapping cells is generated by:
  (a) determining user throughput for the cell during an aggregation period;
  (b) determining a number of active users in the cell during the aggregation period;
  (c) adding a sample on a user throughput plot based on the user throughput and the number of active users determined in the cell during the aggregation period;
  (d) repeating (a)-(c) over a collection period that is longer than the aggregation period to obtain a plurality of samples on the user throughput plot; and
  (e) generating, after the collection period, the load curve for the cell based on the user throughput plot;

determining, based on the load curves, a target number of users per cell of the overlapping cells that maximizes an aggregated user throughput of the overlapping cells of the sector, wherein a sum of the target number of users per cell of the overlapping cells is equal to the total number of active users in the overlapping cells in the sector, wherein determining the target number of users per cell includes using the load curves to determine a base line aggregated user throughput of a base line number of users per cell of the overlapping cells and a recommended aggregated user throughput of the target number of users per cell of the overlapping cells of the sector, and wherein the target number of users per cell of the overlapping cells maximizes the aggregated user throughput in response to a gain threshold between the base line aggregated user throughput and the recommended aggregated user throughput exceeding a predefined gain threshold;

determining recommended load distribution parameters for the sector based on the target number of users per cell of the overlapping cells that maximizes the aggregated user throughput of the overlapping cells of the sector; and applying the recommended load distribution parameters in the sector to distribute users among the cells of the overlapping cells.

9. The method of claim 8 further comprising:

determining a busy hour for the sector;

wherein determining the target number of users per cell comprises determining the target number of users per cell that maximizes the aggregated user throughput of the sector during the busy hour.

10. The method of claim 8 wherein determining the target number of users per cell that maximizes the aggregated user throughput of the sector comprises:

identifying permutations of the target number of users per cell where the sum of the target number of users per cell for each of permutations equals the total number of active users in the sector;

calculating the aggregated user throughput for the sector regarding each of the permutations; and identifying a recommended permutation that provides a maximum aggregated user throughput for the sector, wherein the recommended permutation indicates the target number of users per cell that maximizes the aggregated user throughput of the sector.

11. The method of claim 8 wherein determining the target number of users per cell that maximizes the aggregated user throughput of the sector comprises:

determining an upper bound and a lower bound for the target number of users per cell;

identifying permutations of the target number of users per cell where the sum of the target number of users per cell equals the total number of active users in the sector, and the target number of users per cell is within the upper bound and the lower bound;

calculating the aggregated user throughput for the sector regarding each of the permutations; and identifying a recommended permutation that provides a maximum aggregated user throughput for the sector, wherein the recommended permutation indicates the target number of users per cell that maximizes the aggregated user throughput of the sector.

12. The method of claim 8 wherein:

the recommended load distribution parameters include percentage weights assigned to the cells to distribute the users among the cells, and the percentage weights are limited to a value range;

for each cell of the cells, the method further comprises:
  determining a current percentage weight setting assigned to the cell;
  determining an actual traffic percentage for the cell; and
  calculating an updated percentage weight for the cell by adding the current percentage weight setting to a difference between the actual traffic percentage and an optimized traffic percentage, wherein the optimized traffic percentage is based on the target number of users per cell; and the method further comprises scaling the updated percentage weight for each of the cells to the value range.

13. The method of claim 8 wherein:
the recommended load distribution parameters include percentage weights assigned to the cells to distribute the users among the cells, and the percentage weights are limited to a value range;
for each cell of the cells, the method further comprises:
determining percentage weight settings assigned to the cell for two prior optimization iterations;
determining an actual number of users served by the cell for the two prior optimization iterations;
computing a gradient of a variation of the actual number of users versus a variation of the percentage weight settings for the cell for the two prior optimization iterations; and
calculating an updated percentage weight for the cell by dividing a difference between the target number of users and the actual number of users for the cell by the gradient, and adding a result of the division to the percentage weight setting for the prior optimization iteration; and
the method further comprises scaling the updated percentage weight for each of the cells to the value range.

14. The method of claim 8 further comprising:
determining, at a machine learning system, whether the recommended load distribution parameters for a current optimization iteration provides a positive yield in the aggregated user throughput of the sector based on a yield prediction model;
applying the recommended load distribution parameters in the sector when the recommended load distribution parameters for the current optimization iteration provides a positive yield in the aggregated user throughput of the sector; and
masking the recommended load distribution parameters for the current optimization iteration when the recommended load distribution parameters for the current optimization iteration do not provide a positive yield in the aggregated user throughput of the sector.

15. A non-transitory computer readable medium embodying programmed instructions executed by a processor, wherein the instructions direct the processor to implement a method of load management in a Radio Access Network (RAN), the method comprising:
identifying a plurality of cells overlapping at a sector of the RAN; and
performing sector throughput optimization over multiple optimization iterations of:
determining a total number of active users in the overlapping cells in the sector;
identifying load curves for the overlapping cells, wherein each of the load curves indicates a relationship between user throughput and a number of active users for a respective cell of the overlapping cells, and wherein a load curve for each cell of the overlapping cells is generated by:
(a) determining user throughput for the cell during an aggregation period;
(b) determining a number of active users in the cell during the aggregation period;
(c) adding a sample on a user throughput plot based on the user throughput and the number of active users determined in the cell during the aggregation period;
(d) repeating (a)-(c) over a collection period that is longer than the aggregation period to obtain a plurality of samples on the user throughput plot; and
(e) generating, after the collection period, the load curve for the cell based on the user throughput plot;
determining, based on the load curves, a target number of users per cell of the overlapping cells that maximizes an aggregated user throughput of the overlapping cells of the sector, wherein a sum of the target number of users per cell of the overlapping cells is equal to the total number of active users in the overlapping cells in the sector, wherein determining the target number of users per cell includes using the load curves to determine a base line aggregated user throughput of a base line number of users per cell of the overlapping cells and a recommended aggregated user throughput of the target number of users per cell of the overlapping cells of the sector, and wherein the target number of users per cell of the overlapping cells maximizes the aggregated user throughput in response to a gain threshold between the base line aggregated user throughput and the recommended aggregated user throughput exceeding a predefined gain threshold;
determining recommended load distribution parameters for the sector based on the target number of users per cell of the overlapping cells that maximizes the aggregated user throughput of the overlapping cells of the sector; and
applying the recommended load distribution parameters in the sector to distribute users among the cells of the overlapping cells.

16. The computer readable medium of claim 15 wherein:
the method further comprises determining a busy hour for the sector; and
determining the target number of users per cell comprises determining the target number of users per cell that maximizes the aggregated user throughput of the sector during the busy hour.

* * * * *